US009256716B2

(12) United States Patent
Morita

(10) Patent No.: US 9,256,716 B2
(45) Date of Patent: Feb. 9, 2016

(54) ACCESS AUTHORITY GENERATION DEVICE

(75) Inventor: Yoichiro Morita, Tokyo (JP)

(73) Assignee: NEC CORPORATION, Tokyo (JP)

(*) Notice: Subject to any disclaimer, the term of this patent is extended or adjusted under 35 U.S.C. 154(b) by 63 days.

(21) Appl. No.: 13/819,060

(22) PCT Filed: Jun. 10, 2011

(86) PCT No.: PCT/JP2011/003290
§ 371 (c)(1),
(2), (4) Date: Feb. 26, 2013

(87) PCT Pub. No.: WO2012/039081
PCT Pub. Date: Mar. 29, 2012

(65) Prior Publication Data
US 2013/0160076 A1 Jun. 20, 2013

(30) Foreign Application Priority Data

Sep. 22, 2010 (JP) ................. 2010-211515

(51) Int. Cl.
G06F 21/00 (2013.01)
G06F 21/60 (2013.01)
H04L 29/06 (2006.01)
(52) U.S. Cl.
CPC .............. *G06F 21/00* (2013.01); *G06F 21/604* (2013.01); *H04L 63/105* (2013.01); *H04L 63/20* (2013.01); *G06F 2221/2141* (2013.01); *G06F 2221/2145* (2013.01)
(58) Field of Classification Search
None
See application file for complete search history.

(56) References Cited

U.S. PATENT DOCUMENTS

| 5,889,953 A * | 3/1999 | Thebaut et al. ............... 709/221 |
| 6,237,036 B1 | 5/2001 | Ueno et al. |
| 6,381,639 B1 * | 4/2002 | Thebaut et al. ............... 709/222 |
| 7,185,192 B1 * | 2/2007 | Kahn ............................ 713/155 |
| 7,350,226 B2 * | 3/2008 | Moriconi et al. ................. 726/1 |

(Continued)

FOREIGN PATENT DOCUMENTS

| JP | 11-313102 A | 11/1999 |
| JP | 2002-091816 A | 3/2002 |

(Continued)

*Primary Examiner* — Dede Zecher
*Assistant Examiner* — Richard McCoy
(74) *Attorney, Agent, or Firm* — Sughrue Mion, PLLC

(57) ABSTRACT

A precedence constraint solving means generates a set of authorities without a precedence constraint into a temporary storing means from a set of authorities having a precedence constraint extracted for a role. At this moment, the precedence constraint solving means derives an authority in accordance with an order satisfying the precedence constraint from the set of authorities having the precedence constraint and, when an object of the derived authority includes an object of an authority having the same action already generated in the temporary storing means and permission/denial identifiers of both the authorities are different from each other, divides the derived authority into a plurality of authorities having objects of the same granularity as that of the included object, and stores only an authority having a different object from the included object into the temporary storing means.

16 Claims, 19 Drawing Sheets

(56) References Cited

U.S. PATENT DOCUMENTS

| | | | |
|---|---|---|---|
| 7,363,275 B2* | 4/2008 | Kojima et al. | 705/54 |
| 7,370,344 B2* | 5/2008 | Boozer et al. | 726/2 |
| 7,373,352 B2* | 5/2008 | Roatis et al. | 1/1 |
| 7,953,823 B2* | 5/2011 | Rider et al. | 709/219 |
| 8,010,991 B2* | 8/2011 | Sarukkai et al. | 726/1 |
| 8,381,285 B2* | 2/2013 | Dau et al. | 726/17 |
| 8,387,115 B2* | 2/2013 | Park | 726/3 |
| 2002/0026592 A1* | 2/2002 | Gavrila et al. | 713/201 |
| 2002/0077803 A1 | 6/2002 | Kudoh et al. | |
| 2007/0283443 A1* | 12/2007 | McPherson et al. | 726/26 |
| 2008/0104663 A1 | 5/2008 | Tokutani et al. | |
| 2009/0178102 A1* | 7/2009 | Alghathbar et al. | 726/1 |

FOREIGN PATENT DOCUMENTS

| | | |
|---|---|---|
| JP | 2007-193826 A | 8/2007 |
| JP | 2008-117026 A | 5/2008 |
| WO | 2010/092755 A1 | 8/2010 |

* cited by examiner

FIG. 4A

| ROLE | RULE | | | |
|---|---|---|---|---|
| | PRECEDENCE | OBJECT | ACTION | PERMISSION/DENIAL |
| E401 → A CORPORATION | 1 | kaishadb | Insert | deny |
| | | | Update | deny |
| | | | Delete | deny |
| | | | Select | permit |
| | | | References | permit |
| | | | Create | deny |
| | | | Drop | deny |
| | | | Alter | deny |
| | | | Grant | deny |
| | | | Lock | deny |
| | | | Index | deny |
| E402 → GENERAL AFFAIRS DEPARTMENT | 1 | soumudb | Insert | deny |
| | | | Update | deny |
| | | | Delete | deny |
| | | | Select | permit |
| | | | References | permit |
| | | | Create | deny |
| | | | Drop | deny |
| | | | Alter | deny |
| | | | Grant | deny |
| | | | Lock | deny |
| | | | Index | deny |
| | 2 | kaishadb.shaintable | Insert | permit |
| | | | Update | permit |
| | | | Delete | permit |
| | | | Select | permit |
| | | | References | permit |
| | | | Index | permit |

FIG. 4B

| ROLE | RULE | | | |
|---|---|---|---|---|
| | PRECEDENCE | OBJECT | ACTION | PERMISSION/DENIAL |
| E403 → ACCOUNTING DEPARTMENT | 1 | keiridb.kansatable | Insert | deny |
| | | | Update | deny |
| | | | Delete | deny |
| | | | Select | permit |
| | | | References | permit |
| | | | Index | permit |
| | 2 | keiridb | Insert | permit |
| | | | Update | permit |
| | | | Delete | permit |
| | | | Select | permit |
| | | | References | permit |
| | | | Create | permit |
| | | | Drop | permit |
| | | | Alter | permit |
| | | | Grant | permit |
| | | | Lock | permit |
| | | | Index | permit |
| | 3 | kaishadb.kaikeitable | Insert | permit |
| | | | Update | permit |
| | | | Delete | permit |
| | | | Select | permit |
| | | | References | permit |
| | | | Index | permit |
| E404 → SECRETARY SECTION | 1 | soumudb.hishotable | Insert | permit |
| | | | Update | permit |
| | | | Delete | permit |
| | | | Select | permit |
| | | | References | permit |
| | | | Index | permit |
| E405 → PUBLIC RELATIONS SECTION | 1 | soumudb.kouhoutable | Insert | permit |
| | | | Update | permit |
| | | | Delete | permit |
| | | | Select | permit |
| | | | References | permit |
| | | | Index | permit |

FIG. 5A

| | SUBJECT | OBJECT | ACTION | PERMISSION/DENIAL |
|---|---|---|---|---|
| E501 → | k-satou | kaishadb.kaikeitable | Insert | deny |
| | | | Update | deny |
| | | | Delete | deny |
| | | | Select | permit |
| | | | References | permit |
| | | | Index | deny |
| E502 → | k-satou | kaishadb.shaintable | Insert | permit |
| | | | Update | permit |
| | | | Delete | permit |
| | | | Select | permit |
| | | | References | permit |
| | | | Index | permit |
| E503 → | k-satou | kaishadb | Create | deny |
| | | | Drop | deny |
| | | | Alter | deny |
| | | | Grant | deny |
| | | | Lock | deny |
| E504 → | k-satou | soumudb.hishotable | Insert | deny |
| | | | Update | deny |
| | | | Delete | deny |
| | | | Select | permit |
| | | | References | permit |
| E505 → | k-satou | soumudb.kouhoutable | Insert | deny |
| | | | Update | deny |
| | | | Delete | deny |
| | | | Select | permit |
| | | | References | permit |
| E506 → | k-satou | soumudb | Create | deny |
| | | | Drop | deny |
| | | | Alter | deny |
| | | | Grant | deny |
| | | | Lock | deny |
| | | | Index | deny |

FIG. 5B

| | SUBJECT | OBJECT | ACTION | PERMISSION/DENIAL |
|---|---|---|---|---|
| E507 → | m-suzuki | kaishadb.kaikeitable | Insert | deny |
| | | | Update | deny |
| | | | Delete | deny |
| | | | Select | permit |
| | | | References | permit |
| | | | Index | deny |
| E508 → | m-suzuki | kaishadb.shaintable | Insert | permit |
| | | | Update | permit |
| | | | Delete | permit |
| | | | Select | permit |
| | | | References | permit |
| | | | Index | permit |
| E509 → | m-suzuki | kaishadb | Create | deny |
| | | | Drop | deny |
| | | | Alter | deny |
| | | | Grant | deny |
| | | | Lock | deny |
| E510 → | m-suzuki | soumudb.hishotable | Insert | deny |
| | | | Update | deny |
| | | | Delete | deny |
| | | | Select | permit |
| | | | References | permit |
| E511 → | m-suzuki | soumudb.kouhoutable | Insert | deny |
| | | | Update | deny |
| | | | Delete | deny |
| | | | Select | permit |
| | | | References | permit |
| E512 → | m-suzuki | soumudb | Create | deny |
| | | | Drop | deny |
| | | | Alter | deny |
| | | | Grant | deny |
| | | | Lock | deny |
| | | | Index | deny |

FIG. 5C

| | SUBJECT | OBJECT | ACTION | PERMISSION/ DENIAL |
|---|---|---|---|---|
| E513 → | t-takahashi | kaishadb.kaikeitable | Insert | permit |
| | | | Update | permit |
| | | | Delete | permit |
| | | | Select | permit |
| | | | References | permit |
| | | | Index | permit |
| E514 → | t-takahashi | kaishadb.shaintable | Insert | deny |
| | | | Update | deny |
| | | | Delete | deny |
| | | | Select | permit |
| | | | References | permit |
| | | | Index | deny |
| E515 → | t-takahashi | kaishadb | Create | deny |
| | | | Drop | deny |
| | | | Alter | deny |
| | | | Grant | deny |
| | | | Lock | deny |
| E516 → | t-takahashi | keiridb.kansatable | Insert | deny |
| | | | Update | deny |
| | | | Delete | deny |
| | | | Select | permit |
| | | | References | permit |
| E517 → | t-takahashi | keiridb.keiritable | Insert | permit |
| | | | Update | permit |
| | | | Delete | permit |
| | | | Select | permit |
| | | | References | permit |
| E518 → | t-takahashi | keiridb | Create | permit |
| | | | Drop | permit |
| | | | Alter | permit |
| | | | Grant | permit |
| | | | Lock | permit |
| | | | Index | permit |

FIG. 5D

| | SUBJECT | OBJECT | ACTION | PERMISSION/DENIAL |
|---|---|---|---|---|
| E519 → | t-tanaka | kaishadb.kaikeitable | Insert | permit |
| | | | Update | permit |
| | | | Delete | permit |
| | | | Select | permit |
| | | | References | permit |
| | | | Index | permit |
| E520 → | t-tanaka | kaishadb.shaintable | Insert | deny |
| | | | Update | deny |
| | | | Delete | deny |
| | | | Select | permit |
| | | | References | permit |
| | | | Index | deny |
| E521 → | t-tanaka | kaishadb | Create | deny |
| | | | Drop | deny |
| | | | Alter | deny |
| | | | Grant | deny |
| | | | Lock | deny |
| E522 → | t-tanaka | keiridb.kansatable | Insert | deny |
| | | | Update | deny |
| | | | Delete | deny |
| | | | Select | permit |
| | | | References | permit |
| E523 → | t-tanaka | keiridb.keiritable | Insert | permit |
| | | | Update | permit |
| | | | Delete | permit |
| | | | Select | permit |
| | | | References | permit |
| E524 → | t-tanaka | keiridb | Create | permit |
| | | | Drop | permit |
| | | | Alter | permit |
| | | | Grant | permit |
| | | | Lock | permit |
| | | | Index | permit |

FIG. 5E

| | SUBJECT | OBJECT | ACTION | PERMISSION/DENIAL |
|---|---|---|---|---|
| E525 → | h-watanabe | kaishadb.kaikeitable | Insert | deny |
| | | | Update | deny |
| | | | Delete | deny |
| | | | Select | permit |
| | | | References | permit |
| | | | Index | deny |
| E526 → | h-watanabe | kaishadb.shaintable | Insert | permit |
| | | | Update | permit |
| | | | Delete | permit |
| | | | Select | permit |
| | | | References | permit |
| | | | Index | permit |
| E527 → | h-watanabe | kaishadb | Create | deny |
| | | | Drop | deny |
| | | | Alter | deny |
| | | | Grant | deny |
| | | | Lock | deny |
| E528 → | h-watanabe | soumudb.hishotable | Insert | permit |
| | | | Update | permit |
| | | | Delete | permit |
| | | | Select | permit |
| | | | References | permit |
| | | | Index | permit |
| E529 → | h-watanabe | soumudb.kouhoutable | Insert | deny |
| | | | Update | deny |
| | | | Delete | deny |
| | | | Select | permit |
| | | | References | permit |
| | | | Index | deny |
| E530 → | h-watanabe | soumudb | Create | deny |
| | | | Drop | deny |
| | | | Alter | deny |
| | | | Grant | deny |
| | | | Lock | deny |

FIG. 5F

| | SUBJECT | OBJECT | ACTION | PERMISSION/ DENIAL |
|---|---|---|---|---|
| E531 → | n-itou | kaishadb.kaikeitable | Insert | deny |
| | | | Update | deny |
| | | | Delete | deny |
| | | | Select | permit |
| | | | References | permit |
| | | | Index | deny |
| E532 → | n-itou | kaishadb.shaintable | Insert | permit |
| | | | Update | permit |
| | | | Delete | permit |
| | | | Select | permit |
| | | | References | permit |
| | | | Index | permit |
| E533 → | n-itou | kaishadb | Create | deny |
| | | | Drop | deny |
| | | | Alter | deny |
| | | | Grant | deny |
| | | | Lock | deny |
| E534 → | n-itou | soumudb.hishotable | Insert | permit |
| | | | Update | permit |
| | | | Delete | permit |
| | | | Select | permit |
| | | | References | permit |
| | | | Index | permit |
| E535 → | n-itou | soumudb.kouhoutable | Insert | deny |
| | | | Update | deny |
| | | | Delete | deny |
| | | | Select | permit |
| | | | References | permit |
| | | | Index | deny |
| E536 → | n-itou | soumudb | Create | deny |
| | | | Drop | deny |
| | | | Alter | deny |
| | | | Grant | deny |
| | | | Lock | deny |

FIG. 5G

| | SUBJECT | OBJECT | ACTION | PERMISSION/ DENIAL |
|---|---|---|---|---|
| E537 → | m-yamamoto | kaishadb.kaikeitable | Insert | deny |
| | | | Update | deny |
| | | | Delete | deny |
| | | | Select | permit |
| | | | References | permit |
| | | | Index | deny |
| E538 → | m-yamamoto | kaishadb.shaintable | Insert | permit |
| | | | Update | permit |
| | | | Delete | permit |
| | | | Select | permit |
| | | | References | permit |
| | | | Index | permit |
| E539 → | m-yamamoto | kaishadb | Create | deny |
| | | | Drop | deny |
| | | | Alter | deny |
| | | | Grant | deny |
| | | | Lock | deny |
| E540 → | m-yamamoto | soumudb.hishotable | Insert | deny |
| | | | Update | deny |
| | | | Delete | deny |
| | | | Select | permit |
| | | | References | permit |
| | | | Index | deny |
| E541 → | m-yamamoto | soumudb.kouhoutable | Insert | permit |
| | | | Update | permit |
| | | | Delete | permit |
| | | | Select | permit |
| | | | References | permit |
| | | | Index | permit |
| E542 → | m-yamamoto | soumudb | Create | deny |
| | | | Drop | deny |
| | | | Alter | deny |
| | | | Grant | deny |
| | | | Lock | deny |

FIG. 5H

|  | SUBJECT | OBJECT | ACTION | PERMISSION/DENIAL |
|---|---|---|---|---|
| E543 → | h-nakamura | kaishadb.kaikeitable | Insert | deny |
|  |  |  | Update | deny |
|  |  |  | Delete | deny |
|  |  |  | Select | permit |
|  |  |  | References | permit |
|  |  |  | Index | deny |
| E544 → | h-nakamura | kaishadb.shaintable | Insert | permit |
|  |  |  | Update | permit |
|  |  |  | Delete | permit |
|  |  |  | Select | permit |
|  |  |  | References | permit |
|  |  |  | Index | permit |
| E545 → | h-nakamura | kaishadb | Create | deny |
|  |  |  | Drop | deny |
|  |  |  | Alter | deny |
|  |  |  | Grant | deny |
|  |  |  | Lock | deny |
| E546 → | h-nakamura | soumudb.hishotable | Insert | deny |
|  |  |  | Update | deny |
|  |  |  | Delete | deny |
|  |  |  | Select | permit |
|  |  |  | References | permit |
|  |  |  | Index | deny |
| E547 → | h-nakamura | soumudb.kouhoutable | Insert | permit |
|  |  |  | Update | permit |
|  |  |  | Delete | permit |
|  |  |  | Select | permit |
|  |  |  | References | permit |
|  |  |  | Index | permit |
| E548 → | h-nakamura | soumudb | Create | deny |
|  |  |  | Drop | deny |
|  |  |  | Alter | deny |
|  |  |  | Grant | deny |
|  |  |  | Lock | deny |

FIG. 6

| | ROLE | SUBJECT |
|---|---|---|
| E601 → | GENERAL AFFAIRS DEPARTMENT | k-satou<br>m-suzuki |
| E602 → | ACCOUNTING DEPARTMENT | t-takahashi<br>t-tanaka |
| E603 → | SECRETARY SECTION | h-watanabe<br>n-itou |
| E604 → | PUBLIC RELATIONS SECTION | m-yamamoto<br>h-nakayama |

FIG. 7

|  | ROLE | ROLE OF DIRECT INHERITANCE SOURCE |
|---|---|---|
| E701 → | A CORPORATION |  |
| E702 → | GENERAL AFFAIRS DEPARTMENT | A CORPORATION |
| E703 → | ACCOUNTING DEPARTMENT | A CORPORATION |
| E704 → | SECRETARY SECTION | GENERAL AFFAIRS DEPARTMENT |
| E705 → | PUBLIC RELATIONS SECTION | GENERAL AFFAIRS DEPARTMENT |

FIG. 8

| | ACTION | DIRECTLY ASSOCIATED GRANULARITY | | |
|---|---|---|---|---|
| | | LARGE GRANULARITY ⇔ SMALL GRANULARITY | | |
| | | DB | Table | Column |
| E801 → | Insert | × | ○ | ○ |
| E802 → | Update | × | ○ | ○ |
| E803 → | Delete | × | ○ | × |
| E804 → | Select | × | ○ | × |
| E805 → | References | × | ○ | ○ |
| E806 → | Create | ○ | × | × |
| E807 → | Drop | ○ | × | × |
| E808 → | Alter | ○ | × | × |
| E809 → | Grant | ○ | × | × |
| E810 → | Lock | ○ | × | × |
| E811 → | Index | ○ | ○ | × |

FIG. 9

|  | GRANULARITY | PARENT NODE | IDENTIFIER | CHILD NODE |
|---|---|---|---|---|
| E901 → | DB |  | kaishadb | kaikeitable<br>shaintable |
| E902 → | Table | kaishadb | kaikeitable | kaikeicolumn1<br>kaikeicolumn2 |
| E903 → | Column | kaikeitable | kaikeicolumn1 |  |
| E904 → | Column | kaikeitable | kaikeicolumn2 |  |
| E905 → | Table | kaishadb | shaintable | shaincolumn1<br>shaincolumn2 |
| E906 → | Column | shaintable | shaincolumn1 |  |
| E907 → | Column | shaintable | shaincolumn2 |  |
| E908 → | DB |  | soumudb | hishotable<br>kouhoutable |
| E909 → | Table | soumudb | hishotable | hishocolumn1<br>hishocolumn2 |
| E910 → | Column | hishotable | hishocolumn1 |  |
| E911 → | Column | hishotable | hishocolumn2 |  |
| E912 → | Table | soumudb | kouhoutable | kouhoucolumn1<br>kouhoucolumn2 |
| E913 → | Column | kouhoutable | kouhoucolumn1 |  |
| E914 → | Column | kouhoutable | kouhoucolumn2 |  |
| E915 → | DB |  | keiridb | keiritable<br>kansatable |
| E916 → | Table | keiridb | kansatable | kansacolumn1<br>kansacolumn2 |
| E917 → | Column | kansatable | kansacolumn1 |  |
| E918 → | Column | kansatable | kansacolumn2 |  |
| E919 → | Table | keiridb | keiritable | keiricolumn1<br>keiricolumn2 |
| E920 → | Column | keiritable | keiricolumn1 |  |
| E921 → | Column | keiritable | keiricolumn2 |  |

ACCESS AUTHORITY GENERATION DEVICE

CROSS REFERENCE TO RELATED APPLICATIONS

This application is a National Stage of International Application No. PCT/JP2011/003290 filed Jun. 10, 2011, claiming priority based on Japanese Patent Application No. 2010-211515 filed Sep. 22, 2010, the contents of all of which are incorporated herein by reference in their entirety.

TECHNICAL FIELD

The present invention relates to a device which generates an access authority used for access control in a computer, and also relates to a computer which executes access control by using the generated access authority.

BACKGROUND ART

In a computer, access control using an access authority is executed for the purpose of preventing unauthorized access. An access authority is formed by a combination including a subject as the subject of access, an object as the object of the access, an action as the type of the access, and a permission/denial identifier representing whether to permit or deny the subject to execute the action on the object.

In a computer with a number of subjects, the number of access authorities necessary for access control is huge. Thus, a method for generating access authorities with efficiency by using the concept of role is proposed (e.g., refer to FIG. 20 of Patent Document 1). In this method, in a form without specifying a subject, information of permission or denial of a specific action for a specific object is described as an authority. Moreover, one or more authorities are grouped and each provided with an identifier "role." On the other hand, the relation between a role and a subject is managed separately. Then, a user such as a manager of the computer generates, for each role, authorities each formed by a combination including an object, an action, and a permission/denial identifier representing whether to permit or deny the action on the object. The generation system expands the authorities generated for each role, for each subject belonging to the role, and thereby generates an access authority for each subject.

For example, it is assumed that there are n-pieces of tables from a table T1 to a table Tn as objects. Moreover, it is assumed that a subject S1 and a subject S2 belong to a role R1. Then, in the case of automatically generating access authorities that permit the subjects S1 and S2 to write into the table T1, the user generates an authority P that permits to write into the table T1, in association with the role R1. When this authority P is inputted, the generation system judges that the subject S1 and the subject S2 belong to the role R1 and generates an access authority that permits the subject S1 to write into the table T1 and an access authority that permits the subject S2 to write into the table T1. Consequently, the user does not need to describe a number of access authorities defining actions that can be permitted for each of the subjects, and a burden on the user is reduced.

[Patent Document 1] Japanese Unexamined Patent Application Publication No. 11-313102

As a method for efficiently describing authorities in a case that objects subjected to access control are hierarchized, there is a method using an inclusion relation in the object hierarchy to describe an authority targeting on an upper object. For example, it is assumed that an object in the upper hierarchy including the aforementioned n-pieces of tables T1 to Tn is database DB. In this case, according to the method described above, an authority that permits to write into the database DB is described when writing into all of the tables T1 to Tn is permitted. Consequently, only one authority is required, though n-pieces of authorities are necessary in a case that tables are targets.

However, according to the method described above, it is impossible to make an authority for some objects among a plurality of objects in the lower hierarchy different from that for the other objects. Thus, there is a method of describing, for some objects among lower-hierarchy objects, another authority competing with an authority for an upper-hierarchy object, and setting a constraint so as to preferentially apply the former authority than the latter authority. A constraint so as to preferentially apply one authority than another authority is called a precedence constraint.

For example, in a case that access by the role R1 to (n−1)-pieces of tables T1 to Tn−1 excluding the table Tn from the aforementioned n-pieces of tables T1 to Tn is permitted, two authorities P1 and P2 as shown below are generated.

Authority P1 (priority 1): an authority associated with the role R1, prohibiting writing into the table Tn.

Authority P2 (priority 2): an authority associated with the Role R1, permitting writing into the database DB.

These two authorities P1 and P2 relate to writing into the table Tn, and compete with each other because one prohibits and the other permits. However, because of the precedence constraint, the authority P1 with a higher priority is applied with respect to writing into the table Tn. Therefore, the subjects S1 and S2 belonging to the role R1 are prohibited from writing into the table Tn. On the other hand, because the authority P2 is applied with respect to writing into the tables T1 to Tn−1, the subjects S1 and S2 belonging to the role R1 are permitted to write into the tables T1 to Tn−1.

By describing an authority by using the inclusion relation of the objects and the precedence constraint as described above, it is possible to reduce the number of necessary authorities, and it is possible to reduce the burden on the user. However, the technique described in Patent Document 1 does not deal with an authority described by using the inclusion relation of the objects and the precedence constraint. Therefore, in a case that the authorities P1 and P2 with the precedence constraint as described in the above example are processed based on the technique described in Patent Document 1, access authorities competing with each other are generated. That is to say, when the authorities P1 and P2 are processed, an access authority that permits writing into the database DB and an access authority competing therewith that prohibits writing into the table Tn are generated for the subjects S1 and S2.

Among the computers executing access control using an access authority, some computers cannot process access authorities competing with each other, and some computers can process the competing access authorities but processes in different manners from the other computers. Therefore, in order to ensure that all of the computers execute accurate access control, there is a need to generate access authorities that do not compete with each other.

SUMMARY

An object of the present invention is to provide an access authority generation device that solves the aforementioned problem, namely, a problem that authorities described by using an inclusion relation of objects and a precedence constraint produce access authorities competing with each other.

An access authority generation device according to an exemplary embodiment of the present invention includes:

a policy storing means for storing a set of authorities having a precedence constraint, in association with a role, wherein a combination of an object, an action and a permission/denial identifier representing whether to permit or deny the action on the object is defined as an authority;

a subject assignment storing means for storing information about a relation between a role and a subject belonging to the role;

an object hierarchy storing means for storing information about an inclusion relation between objects;

a temporary storing means;

a process target set extracting means for extracting a set of authorities having a precedence constraint from the policy storing means, as a process target set, in association with a role;

a precedence constraint solving means for generating a set of authorities without a precedence constraint into the temporary storing means from the process target set extracted for a role, in association with the role, the precedence constraint solving means being configured to:

derive an authority in accordance with an order satisfying the precedence constraint from the process target set associated with the role, and determine the derived authority, as a process target authority;

in a case that an object of the process target authority includes an object of an authority having a same action that has already been generated in the temporary storing means and permission/denial identifiers of both the authorities are different from each other, divide the process target authority into a plurality of authorities having objects of same granularity as that of the included object; and store an authority having a different object from the included object among the plurality of authorities obtained by the division, into the temporary storing means; and an access authority generating means for generating a set of access authorities associated with the subject from the set of authorities without the precedence constraint generated for the role and the information about the relation between the role and the subject, wherein a combination of a subject, an object, an action and a permission/denial identifier representing whether to permit or deny the subject the action on the object is defined as an access authority.

Because the present invention is configured as described above, even if there is a competition spanning object hierarchies between a plurality of authorities having precedence constraints, in a case that the form of the competition is a form that an object with an authority of a lower priority includes an object with an authority with a higher priority, it is possible to generate access authorities that do not compete with each other equivalent to the plurality of authorities having the precedence constraints.

BRIEF DESCRIPTION OF DRAWINGS

FIG. 4A is a view showing an example of a policy stored by a policy storing means in the second exemplary embodiment of the present invention;

FIG. 4B is a view showing the example of the policy stored by the policy storing means in the second exemplary embodiment of the present invention;

FIG. 5A is a view showing an example of access authorities outputted by the policy interpreting means and inputted into an access control executing means in the second exemplary embodiment of the present invention;

FIG. 5B is a view showing the example of the access authorities outputted by the policy interpreting means and inputted into the access control executing means in the second exemplary embodiment of the present invention;

FIG. 5C is a view showing the example of the access authorities outputted by the policy interpreting means and inputted into the access control executing means in the second exemplary embodiment of the present invention;

FIG. 5D is a view showing the example of the access authorities outputted by the policy interpreting means and inputted into the access control executing means in the second exemplary embodiment of the present invention;

FIG. 5E is a view showing the example of the access authorities outputted by the policy interpreting means and inputted into the access control executing means in the second exemplary embodiment of the present invention;

FIG. 5F is a view showing the example of the access authorities outputted by the policy interpreting means and inputted into the access control executing means in the second exemplary embodiment of the present invention;

FIG. 5G is a view showing the example of the access authorities outputted by the policy interpreting means and inputted into the access control executing means in the second exemplary embodiment of the present invention;

FIG. 5H is a view showing the example of the access authorities outputted by the policy interpreting means and inputted into the access control executing means in the second exemplary embodiment of the present invention;

FIG. 6 is a view showing an example of a subject assignment stored by a subject assignment storing means in the second exemplary embodiment of the present invention;

FIG. 7 is a view showing an example of a role hierarchy stored by a role hierarchy storing means in the second exemplary embodiment of the present invention;

FIG. 8 is a view showing an example of an action hierarchy in a case that database is dealt with as an object stored by an action hierarchy storing means in the second exemplary embodiment of the present invention;

FIG. 9 is a view showing an example of an object hierarchy stored by an object hierarchy storing means in the second exemplary embodiment.

EXEMPLARY EMBODIMENTS

Next, exemplary embodiments of the present invention will be described in detail with reference to the drawings.

First Exemplary Embodiment

Figure 1:
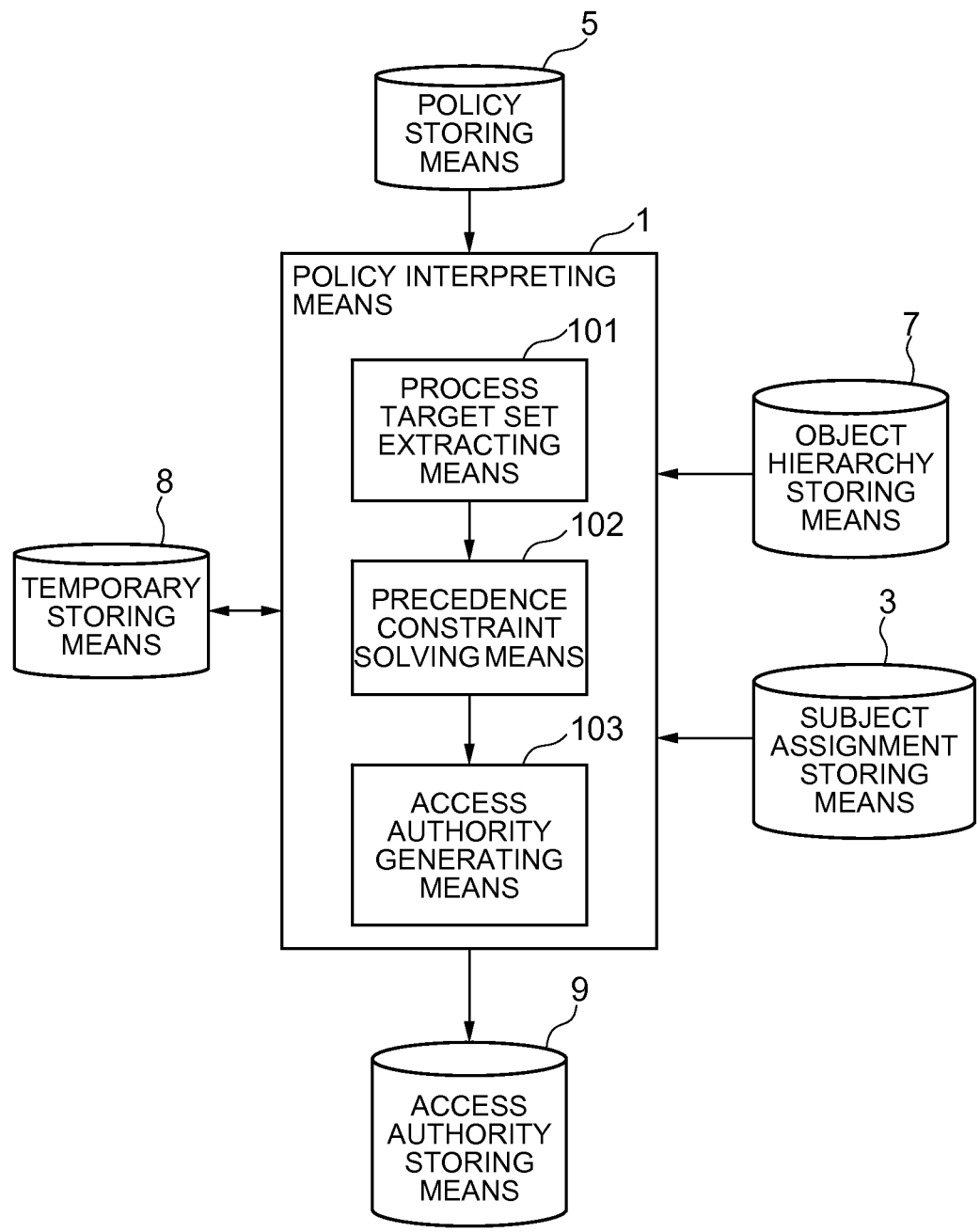
FIG. 1 is a block diagram of a first exemplary embodiment of the present invention.

With reference to FIG. 1, an access authority generation device according to a first exemplary embodiment of the present invention includes a policy interpreting means 1, a subject assignment storing means 3, a policy storing means 5, an object hierarchy storing means 7, a temporary storing means 8, and an access authority storing means 9.

The policy storing means 5 stores a set of authorities having a precedence constraint for each role. Herein, an authority is a combination including an object, an action, and a permission/denial identifier representing whether to permit or deny the action on the object.

The object hierarchy storing means 7 stores information on an inclusion relation between objects. The temporary storing means 8 stores information in process by the policy interpreting means 1. The subject assignment storing means 3 stores information on the relation between a role and a subject belonging to the role. The access authority storing means 9 stores a generated access authority. Herein an access authority is a combination including a subject, an object, an action, and a permission/denial identifier representing whether to permit or deny the subject to execute the action on the object.

The policy interpreting means 1 has a function of generating an access authority without a precedence constraint from the set of authorities having the precedence constraint. The policy interpreting means 1 has a process target set extracting means 101, a precedence constraint solving means 102, and an access authority generating means 103.

The process target set extracting means 101 extracts, for each role, the set of authorities having the precedence constraint as a process target set from the policy storing means 5.

The precedence constraint solving means 102 has a function of generating, for each role, a set of authorities without a precedence constraint into the temporary storing means 8 from the process target set extracted for the role.

To be specific, the precedence constraint solving means 102 has a function of deriving an authority as a process target authority in accordance with a precedence satisfying the precedence constraint from the process target set associated with the role.

Further, the precedence constraint solving means 102 has a function of, in a case that the object of the process target authority derived as described above includes an object of an authority which has already been generated in the temporary storing means 8 and which has the same action and the permission/denial identifiers are different from each other, dividing the process target authority into a plurality of authorities having objects of the same granularity as the included object. Herein, at the time of judgment of an inclusion relation between objects and division of the objects, the precedence constraint solving means 102 judges and divides based on information on the inclusion relation between the objects stored by the object hierarchy storing means 7.

Further, the precedence constraint solving means 102 has a function of storing an authority having an object different from the included object into the temporary storing means 8 from among the plurality of authorities obtained by the division.

The access authority generating means 103 has a function of, from a set of authorities without precedence constraints generated for a role and information on the relation between a role and a subject stored in the subject assignment storing means 3, generating a set of access authorities corresponding to a subject.

The policy interpreting means 1 described above can be configured by, for example, a processor such as a microprocessor. Moreover, the subject assignment storing means 3, the policy storing means 5, the object hierarchy storing means 7, the temporary storing means 8 and the access authority storing means 9 that are described above can be each configured by, for example, a memory connected to the processor. Moreover, the memory stores a program. This program is read by the processor configuring the policy interpreting means 1 and, by control of the operation of the processor, the process target set extracting means 101, the precedence constraint solving means 102 and the access authority generating means 103 that are described above are realized on the processor. Other than stored in the memory connected to the processor, the program described above may be stored on a computer-readable recording medium, for example, a portable medium such as a flexible disk, an optical disk, a magneto-optical disk and a semiconductor memory.

Next, an operation of the access authority generation device according to this exemplary embodiment will be described.

First, the process target set extracting means 101 of the policy interpreting means 1 extracts, for each role, a set of authorities having a precedence constraint from the policy storing means 5.

Next, the precedence constraint solving means 102 of the policy interpreting means 1 generates a set of authorities without a precedence constraint from a process target set associated with to a role, and stores into the temporary storing means 8. To be specific, the precedence constraint solving means 102 derives authorities as process target authorities one by one in order from the process target set associated with the role in accordance with an order satisfying the precedence constraint. Then, the precedence constraint solving means 102 executes the following process on each of the derived process target authorities in a case that the object thereof includes an object of an authority which has already been generated in the temporary storing means 8 and has the same action and the permission/denial identifiers are different from each other. First, the precedence constraint solving means 102 divides the process target authority into a plurality of authorities having an object of the same granularity as the included object. Next, the precedence constraint solving means 102 stores an authority having an object different from the included object into the temporary storing means 8, among the plurality of authorities obtained by the division. On the other hand, in a case that the object of the derived process target authority is not included in an object of an authority which has already been generated in the temporary storing means 8 and which has the same action, or in a case that the object of the derived process target authority is included but the permission/denial identifiers are the same, the precedence constraint solving means 102 stores the derived process target authority into the temporary storing means 8.

The access authority generating means 103 generates a set of access authorities associated with a subject from a set of authorities generated for a role and information on the relation between a role and a subject stored in the subject assignment storing means 3.

Next, an operation according to this exemplary embodiment will be described with reference to a specific example.

For example, it is assumed that in order to permit the role R1 to access (n−1)-pieces of tables T1 to Tn−1 excluding the table Tn from the n-pieces of tables T1 to Tn, the following two authorities P1 and P2 are stored in the policy storing means 5.

Authority P1 (priority 1): an authority associated with the role R1, prohibiting writing into the table Tn.

Authority P2 (priority 2): an authority associated with the Role R1, permitting writing into the table Tn In the access authority generation device according to this exemplary embodiment, when a set of authorities having a precedence constraint including the authorities P1 and P2 is extracted as a process target set, the precedence constraint solving means 102 firstly processes the authority P1 because the authority P1 has a higher priority than the authority P2, and stores the authority generated consequently, for example, an authority associated with the role R1 representing prohibition to write into the table Tn, into the temporary storing means 8.

Next, the precedence constraint solving means 102 starts processing the authority P2. In this processing of the authority P2, the precedence constraint solving means 102 detects that an object (the database DB) of the authority P2 with a lower priority includes an object (the table Tn) of the authority P1 with a higher priority and the permission/denial identifiers on the same action are different from each other. Then, the precedence constraint solving means 102 divides the authority P2 into a plurality of authorities having objects (the tables T1 to Tn) of the same granularity as the included object (the table Tn). That is to say, the precedence constraint solving means 102 divides the authority P2 into an authority representing permission to write into the table T1, an authority representing permission to write into the table T2, ... and an authority representing permission to write into the table Tn. Then, the precedence constraint solving means 102 stores, into the temporary storing means 8, authorities having an object (T1 to Tn−1) different from the included object (the table Tn), namely, an authority representing permission to write into the table T1, an authority representing permission to write into the table T2, ... an authority to represent permissions to write to the table Tn−1.

Consequently, in the temporary storing means 8, authorities without a precedence constraint equivalent to the authorities P1 and P2 having the precedence constraint described above, namely, an authority representing prohibition to write into the table Tn and an authority representing permission to write into the tables T1 to Tn−1 that are associated with the role R1 are generated.

After that, from the set of authorities without the precedence constraint generated for the role R1 and information on the relation between the role R1 and a subject stored in the subject assignment storing means 3, the access authority generating means 103 generates a set of access authorities corresponding to the subject.

As described above, even if a competition spanning object hierarchies exists between a plurality of authorities having a precedence constraint, when the form of the competition is competition that an object of a lower-priority authority includes an object of a higher-priority authority, the access authority generation device according to this exemplary embodiment can generate an access authority without competition equivalent to a plurality of authorities having a precedent constraint.

The access authority generation device according to the present invention can be provided with and changed in various manners as described below, for example.

For example, the access authority generation device may further include a role hierarchy storing means for storing information on an inheritance relation between roles, and the process target set extracting means 101 may be configured to extract and couple a set of authorities having a precedence constraint stored in the policy storing means 5 in association with a role and a set of authorities having a precedence constraint stored in the policy storing means in association with an inheritance source role of the role shown in an inheritance relation between roles, and generate a process target set as a set of authorities having a precedence constraint.

Further, the precedence constraint solving means 102 may be configured to discard a process target authority having an object included in an object of an authority having the same action stored in the temporary storing means 8 are generated. A process target authority having an object included in an object of an authority having the same action stored in the temporary storing means 8 needs to be discarded when competes with an authority having the same action stored in the temporary storing means 8 and, even when does not compete, preferably discarded to solve redundancy of authority.

Further, the access authority generation device may include an action hierarchy storing means for storing information on the relation between the object and an action, and the precedence constraint solving means 102 may be configured to, when an action of a process target authority does not correspond to the granularity of an object of the process target authority, process by dividing the process target authority into a plurality of process target authorities having objects with smaller granularity.

Further, the precedence constraint solving means 102 may be configured to, in a case that an object of a process target authority includes an object of an authority having the same action stored in the temporary storing means 8 and permission/denial identifiers are consistent, in order to solve redundancy of the authorities, store the process target authority in the temporary storing means 8, and delete an authority having the same action, the same permission/denial identifier as stored in the temporary 8.

Further, the access authority generating means 103 may be configured to, in order to make access authorities compact, integrate a plurality of access authorities in which subjects, objects and permission/denial identifiers are the same and actions are different from each other into one access authority.

Second Exemplary Embodiment

Next, a second exemplary embodiment of the present invention will be described. Firstly, terms used in this exemplary embodiment will be described.

"Access" refers to a combination including a specific subject (s), an object (o), and an action (a).

"An access authority" refers to a combination including a specific access and an identifier representing permission or denial regarding the access. In order to securely designate the result of judgment of access control equivalent to an access control policy having a precedence constraint in a set of access authorities set for an access control execution function, there is a need to, when there is a set of access authorities such that a precedence constraint or a competition spanning different object hierarchies exists, previously eliminate the precedence constraint or the competition spanning object hierarchies so that the access authorities do not compete with each other. If a precedence constraint or a competition spanning different object hierarchies exists in a set of access authorities set for an access control execution function, the result of judgment of access control varies depending on a judgment method of each access control execution function. Moreover, an access control execution function by which it is impossible to process the precedence constraint or the completion spanning different object hierarchies also exist.

"Object-action" refers to a combination including a specific object (o) and an action (a).

"Authority" refers to a combination including a specific object-action and an identifier representing permission or denial of the object-action. Therefore, an access authority is also a combination including a specific subject and an authority.

"Action permission/denial" refers to a combination including a specific action and an identifier representing permission or denial of the action. Therefore, an action permission/denial is also a combination including a specific object and an action permission/denial.

"Role" is an identifier provided to a set of authorities. In general, the names of a department, position, project in charge, business, work item, or the like are used.

"Subject assignment" is the definition of assignment of a subject to a role. It is described in the form of a combination of a subject and a role. Each subject has one role at most. In general, a subject having no role (having zero roles) has no authority. As for a subject of access, a role may be designated instead of a subject in a case that a target access control execution function is compatible. Therefore, a set of access authorities is a combination including a set of subjects and a set of authorities, or a combination including a role and a set of authorities.

"Access control rule" and "rule" are descriptions for defining a set of authorities.

"Access control policy" and "policy" represent a list of an access control rule having a precedence constraint, associated with a role.

"Role hierarchy" refers to a hierarchical relation of roles based on an organization structure or the like. In general, a role hierarchy forms a tree structure having multiple layers of hierarchies. For example, the role hierarchy of a certain company "A Corporation" forms a tree structure with "A Corporation" as the root, "general affairs department" and "accounting department" below the root, and moreover, "secretary section" and "public relations section" below "general affairs department."

"Role inheritance" and "inheritance" refer to an inheritance relation based on a role hierarchy. For example, in the example of the role hierarchy described above, the "secretary section" role inherits the "general affairs department" role, and the "general affairs department" role inherits the "A Corporation" role. By role inheritance, an inheritance destination role takes over a set of authorities of an inheritance source role. The inheritance destination's set has a higher priority than the inheritance source's set, and the authorities of the inheritance source can be corrected based on the authorities of the inheritance destination. Therefore, the set of authorities of both the inheritance source role and the inheritance destination role is applied to a subject having the inheritance destination role. However, in a case that there is a difference in the combination of a certain object-action and a permission/denial between the roles, the authorities of the inheritance destination are applied. An inheritance source role for one role is only one.

"Direct role" and "direct" refer to, considering an inheritance as a parent-child relation in which a child inherits from a parent, a role in a direction relation for a certain role, and a set of the certain role, an ancestor role and a descendent role. Therefore, in a tree structure, the direct role is a set of the certain role, a group of roles reached when an inheritance source is traced from the certain role to the root, and a group of roles reached when an inheritance destination is traced from the certain role to the leaves.

"Object hierarchy" is configured by a set of identifiers each representing the granularity of an object, identifiers of the respective objects, and paths and identifiers such as a child node and a parent node each representing a hierarchical relation between an object and another object. As the identifiers, separate values may be used, or some values may be shared. Anyway, the object hierarchy holds a hierarchical relation between objects with different granularities. As a hierarchical structure, the object hierarchy has a tree structure such that zero or more objects with middle granularity exist as child nodes below an object with large granularity and zero or more objects with small granularity exist as child nodes below the object with middle granularity. Between the objects in the parent-child relation, a parent object with larger granularity includes an object having smaller granularity.

"Action hierarchy" is a description which defines an association of an action with the granularity of an object in a case that associated actions are different depending on the granularities of objects. In general, a set of actions associated with a specific object is a subset of a set of all actions. An access authority outputted to an access control executing means designates an action permission/denial with respect to only an action associated with the granularity of an object designated in the access authority, and does not designate with respect to an action that is not associated with the granularity of the object. In the description of the access control rule in the access control policy, it is possible to set in the same manner as the access authority outputted to the access control executing means so as to designate an action permission/denial with respect to only an action directly associated with the granularity of an object designated in the rule and so as not to designate with respect to an action that is not directly associated with the granularity of the object. However, because the rule is expressed in an integrated and simplified manner by using the inclusion relation regarding the object hierarchy described above, there is a case that it is possible to designate an action permission/denial with respect to an action that is not directly associated with the granularity of the object. To be specific, in a case that some objects with small granularity exist below an object with large granularity and the objects with small granularity are directly associated with a specific action but the object with large granularity is not directly associated with the action, it is possible, when describing a rule designating the action, to describe a rule of the object with large granularity instead of listing all rules of the objects with small granularity. That is to say, it is possible to consider an action which is not directly associated with the granularity of a certain object and is directly associated with a smaller granularity than that of the object is indirectly associated with the object. In an example of the action hierarchy shown in FIG. 8, an action "Insert" is not directly associated with a large granularity "DB" of an object and is directly associated with a middle granularity "Table" and a small granularity "Column." In this case, the action "Insert" is indirectly associated with an object of the granularity "DB."

Figure 2:
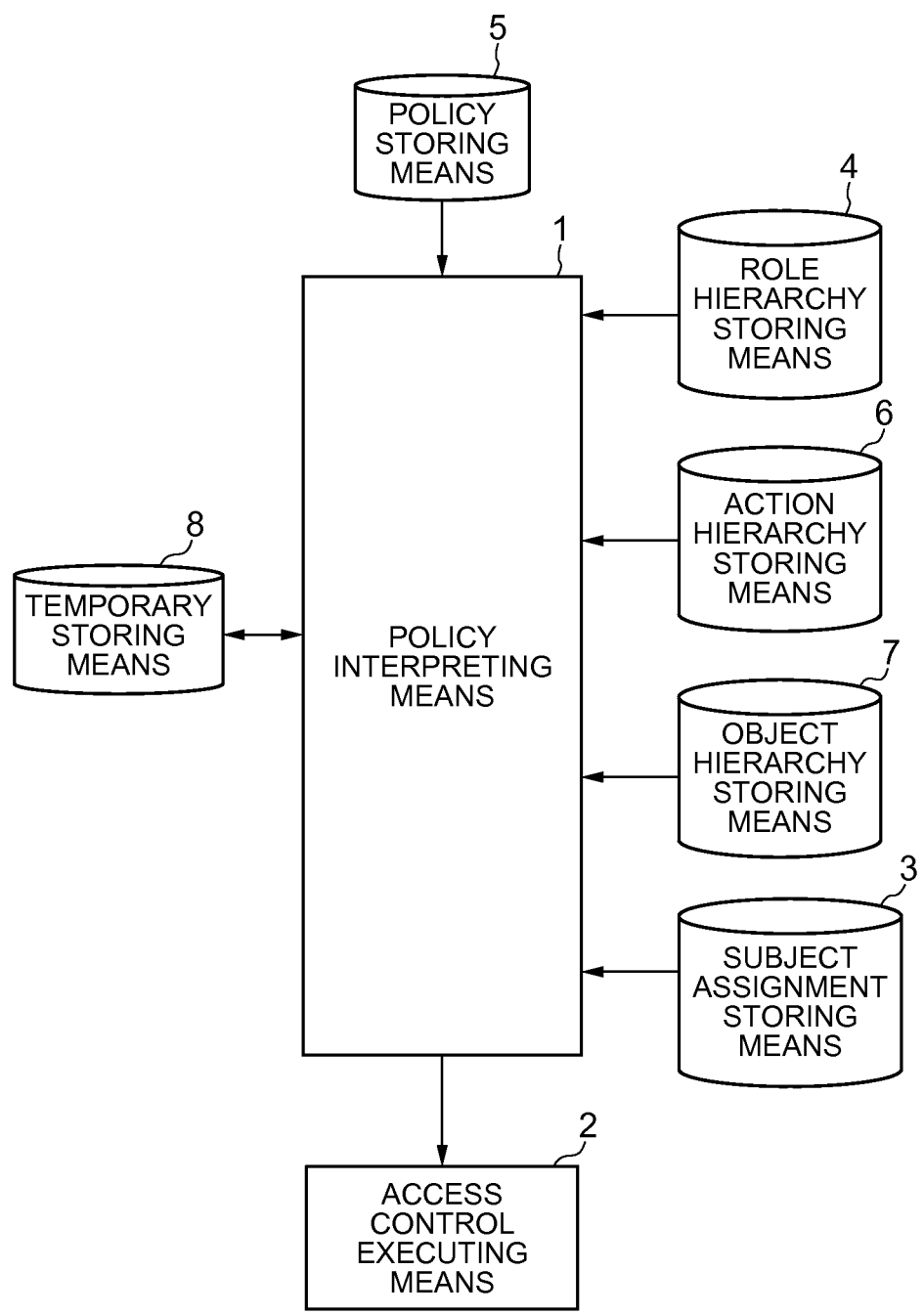
FIG. 2 is a block diagram of a second exemplary embodiment of the present invention.

With reference to FIG. 2, the access control system according to this exemplary embodiment includes the policy interpreting means 1, an access control executing means 2, the subject assignment storing means 3, a role hierarchy storing means 4, the policy storing means 5, an action hierarchy storing means 6, the object hierarchy storing means 7, and the temporary storing means 8.

The policy interpreting means 1 and the access control executing means 2 may be structured by separate computer systems, or may be partially or entirely realized by the same computer system.

Further, to be specific, the policy interpreting means 1 is realized by a CPU of an information processing device operating in accordance with a program, a storage medium such as a RAM, and a communication interface for performing communication with the access control executing means 2, the subject assignment storing means 3, the role hierarchy storing means 4, the policy storing means 5, the action hierarchy storing means 6 and the object hierarchy storing means 7. Moreover, to be specific, the access control executing means 2 is realized by a CPU of an information processing device operating in accordance with a program, a storage medium such as a RAM, and a communication interface for performing communication with the policy interpreting means 1. Furthermore, to be specific, the subject assignment storing means 3, the role hierarchy storing means 4, the policy storing means 5, the action hierarchy storing means 6 and the object hierarchy storing means 7 are each realized by a CPU of an information processing device operating in accordance with a program, and a storage medium such as a RAM or a hard disk. Besides, the temporary storing means 8 is realized by a storage medium such as a RAM.

The policy interpreting means 1 acquires a policy and information necessary for interpreting the policy from the subject assignment storing means 3, the role hierarchy storing means 4, the policy storing means 5, the action hierarchy storing means 6 and the object hierarchy storing means 7, interprets the policy to generate an access authority while storing the interim result into the temporary storing means 8, and outputs the access authority to the access control executing means 2.

The access control executing means 2 executes access control based on the access authority inputted from the policy interpreting means 1.

Figure 10:
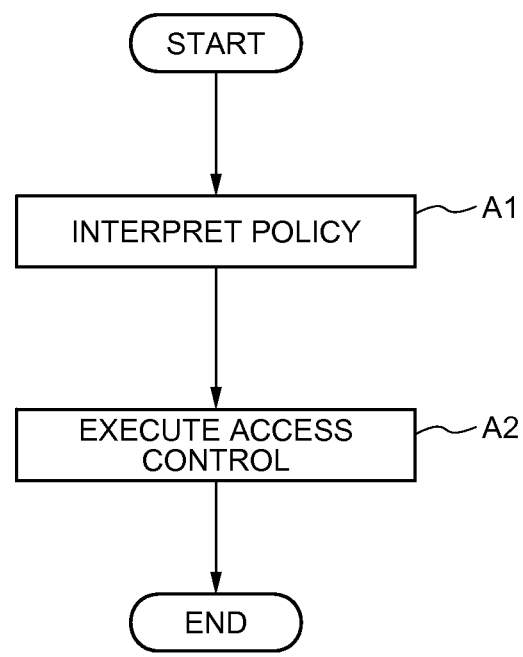
FIG. 10 is a flowchart showing a schematic operation of the second exemplary embodiment of the present invention.

With reference to FIG. 10, the outline of a process in this exemplary embodiment will be described.

(1) Step A1

First, the policy interpreting means 1 executes a policy interpretation process, and outputs generated an access authority to the access control executing means 2. For example, the policy interpreting means 1 executes the policy interpretation process on a policy as shown in FIGS. 4A and 4B, and outputs a generated access authority as shown in FIGS. 5A to 5H.

(2) Step A2

Next, the access control executing means 2 executes an access control process based on the access authority inputted from the policy interpreting means 1.

Figure 3A:
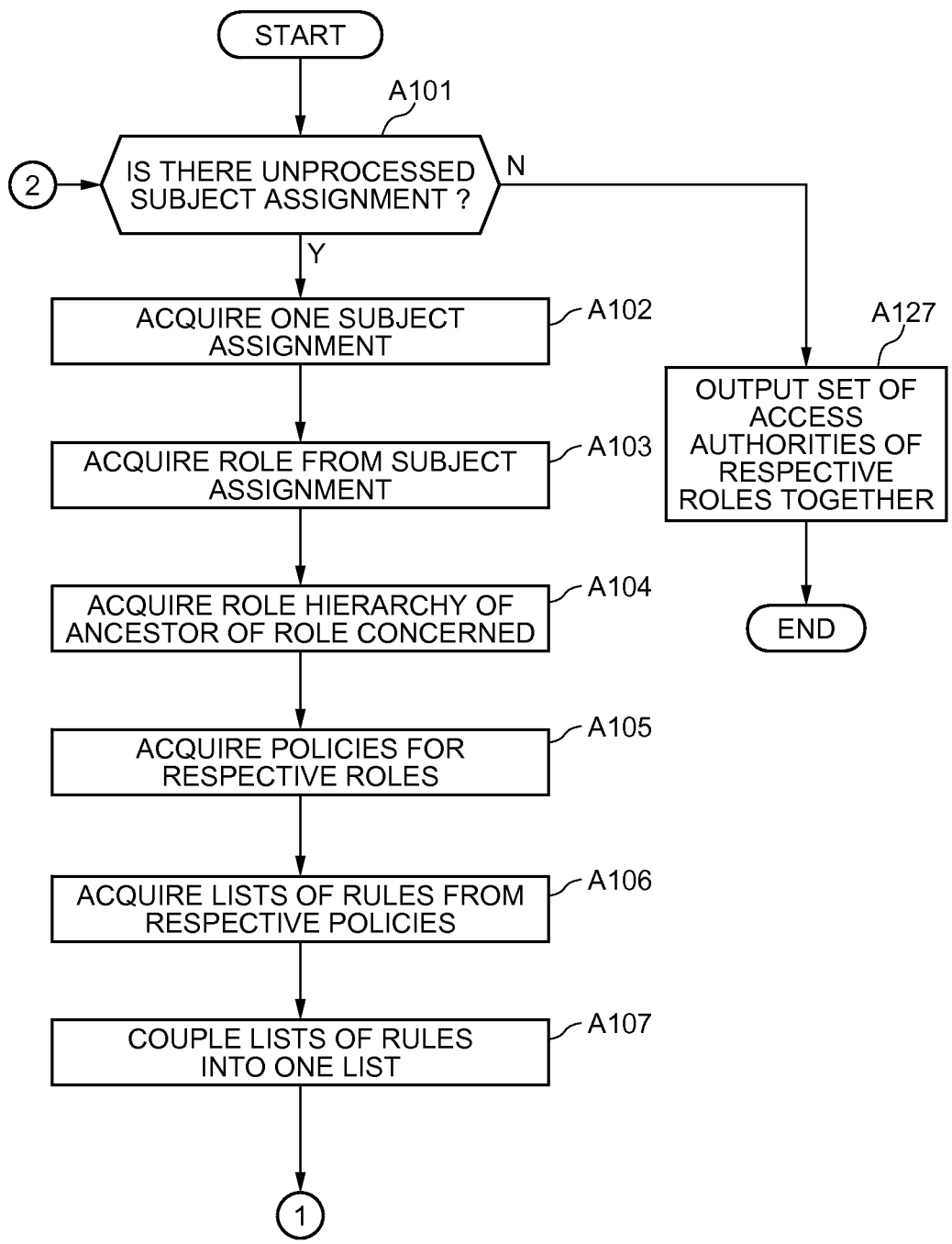
FIG. 3A is a flowchart showing an operation of a policy interpreting means in the second exemplary embodiment of the present invention.
Figure 3B:
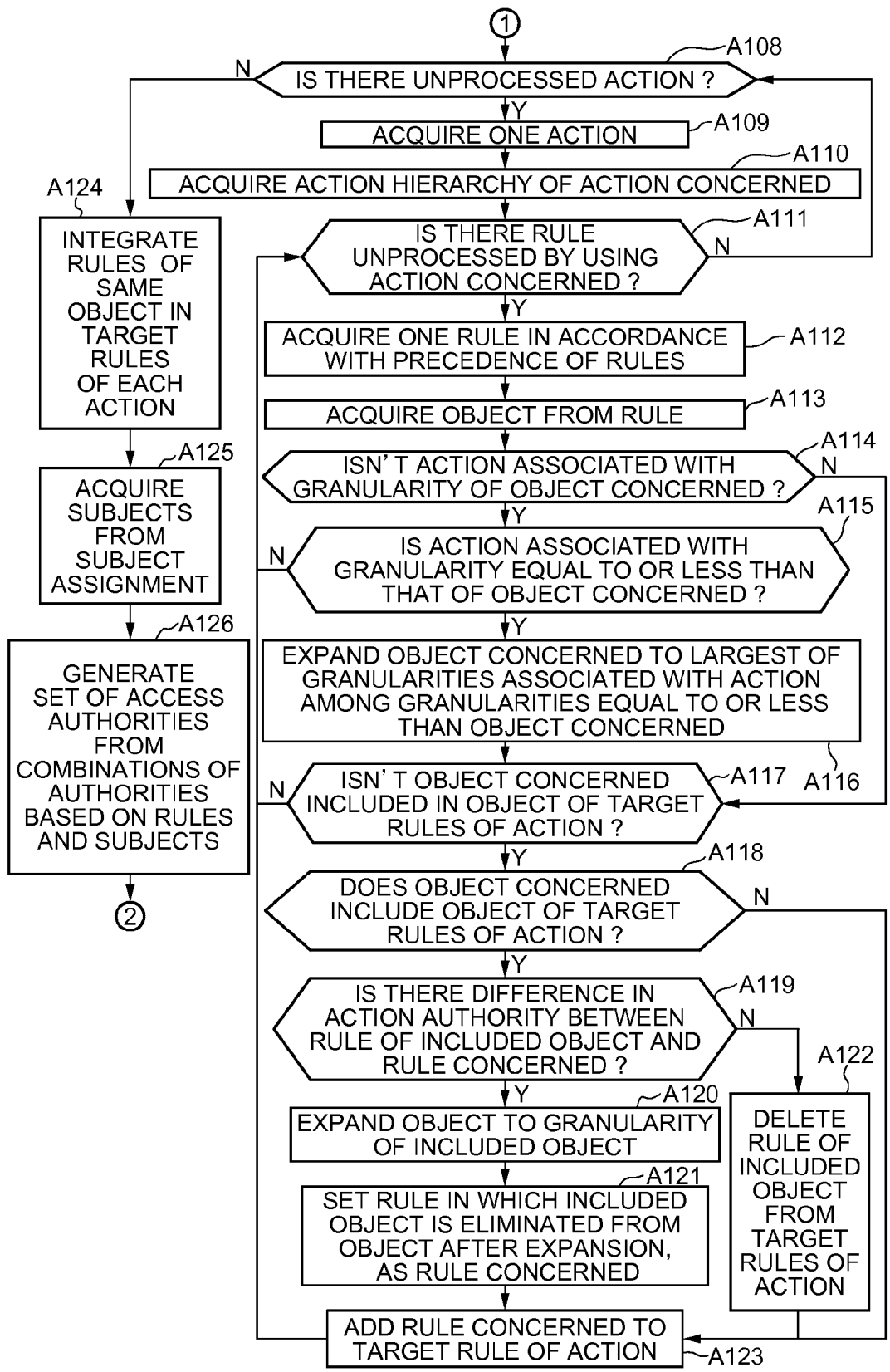
FIG. 3B is a flowchart showing the operation of the policy interpreting means in the second exemplary embodiment of the present invention.

With reference to FIGS. 3A and 3B, an operation of the policy interpreting means 1 will be described in detail.

(1) Step A101

First, the policy interpreting means 1 refers to the subject assignment storing means 3 and judges whether there is an unprocessed subject assignment. When there is an unprocessed one, the policy interpreting means 1 proceeds to step A102. When there is no unprocessed one, that is, when all subject assignments have already been processed, the policy interpreting means 1 proceeds to step A127. In the subject assignment storing means 3, for example, information as shown in FIG. 6 is stored as subject assignments.

(2) Step A102

Next, the policy interpreting means 1 refers to the subject assignment storing means 3, and acquires one unprocessed subject assignment. For example, the policy interpreting means 1 acquires a subject assignment E601 in FIG. 6. The subject assignment E601 is a combination of a role "general affairs department" and a set of subjects ("k-satou" and "m-suzuki"). This is a description which defines a combination including the subject "k-satou" and the role "general affairs department" and a combination including the subject "m-suzuki" and the role "general affairs department" together.

(3) Step A103

Next, the policy interpreting means 1 refers to the subject assignment concerned, and acquires a role designated in the subject assignment concerned. For example, when the subject assignment concerned is E601, the policy interpreting means 1 acquires the role "general affairs department."

(4) Step A104

Next, the policy interpreting means 1 refers to the role hierarchy storing means 4 and, originating from the role of the subject assignment concerned, acquires an ancestor role hierarchy the role concerned including a parent role of the role concerned and a parent role of the parent role, and acquires an ancestor role from the role hierarchy. In the role hierarchy storing means 4, for example, information as shown in FIG. 7 is stored as the role hierarchy. For example, in a case that the role concerned is the "general affairs department," the policy interpreting means 1 acquires a parent role "A Corporation" from a role hierarchy E702 defining the role concerned. It is found from a role hierarchy E701 that there is no parent role of "A Corporation," the ancestor role is ("A Corporation").

(5) Step A105

Next, the policy interpreting means 1 refers to the policy storing means 5 and, with respect to the role concerned and the ancestor role, acquires policies for the respective roles. In the policy storing means 5, for example, information as shown in FIG. 4 is stored as the policies. For example, in a case that the role concerned is "general affairs department," the policy interpreting means 1 acquires a policy E402 of "general affairs department" and a policy E401 of the ancestor role "A Corporation."

(6) Step A106

Next, the policy interpreting means 1 refers to the policy of the role concerned and the policy of the ancestor role and, for each of the policies, acquires a list of rules described in the policy. For example, in the case of E402 and E401, a first rule that is on the top of the list of the rules of E402 and is given the highest priority is a combination of an object "soumudb" and a set of action permissions/denials (("Insert," "deny"), ("Update," "deny"), ("Delete," "deny"), ("Select," "permit"), ("References," "permit"), ("Create," "deny"), ("Drop," "deny"), ("Alter," "deny"), ("Grant," "deny"), ("Lock," "deny"), ("Index," "deny")). In the same way, the policy interpreting means 1 acquires a list of a second rule of E402 and a list of a rule of E401.

(7) Step A107

Next, with respect to the lists of the rules associated with the role concerned and the ancestor role, the policy interpreting means 1 couples the lists of the rules so that the role concerned has the highest priority and the remoter ancestor role has a lower priority. To be specific, the policy interpreting means 1 couples the lists by arranging the rules so that, as a rule having a lower priority than a rule having the lowest priority among the rules of the role concerned, a rule having the highest priority among the rules of the parent role of the role concerned is placed. By coupling the lists of the ancestor roles in order in the same manner, the policy interpreting means 1 generates one list as a whole. For example, in the case of the lists of the rules of E402 and E401, as a rule having a lower priority than a second rule of E402 having the lowest priority of E402, the first rule of E401 is placed. In the coupled list generated as a result, the rules are arranged in order of the first rule of E402, the second rule of E402, and the first rule of E401.

(8) Step A108

Next, the policy interpreting means 1 refers to the action hierarchy storing means 6 and judges whether there is an unprocessed action. When there is an unprocessed one, the policy interpreting means 1 proceeds to step A109. When there is no unprocessed one, that is, when all actions have already been processed, the policy interpreting means 1 proceeds to step A124. In the action hierarchy storing means 6, for example, information as shown in FIG. 8 is stored as action hierarchies. In a case that one or more action hierarchies are defined, all actions are unprocessed when the policy interpreting means 1 proceeds to step A108 for the first time after step A107.

(9) Step A109

Next, the policy interpreting means 1 refers to the action hierarchy storing means 6, and acquires one of the unprocessed actions. For example, the policy interpreting means 1 refers to E801, and acquires an action "Insert."

(10) Step A110

Next, the policy interpreting means 1 refers to the action hierarchy storing means 6, and acquires an action hierarchy of the action concerned, namely, a granularity-order list defining objects with which the action concerned is associated or is not associated. For example, in a case that the action concerned is "Insert," the policy interpreting means 1 acquires (("DB," "x"), ("Table," "○"), ("Column," "○")) as a list of objects with which the action concerned is associated or is not associated. Herein, "○" represents the action is associated, and "x" represents the action is not associated.

(11) Step A111

Next, the policy interpreting means 1 judges whether there is a rule that has not been processed by using the action. When there is an unprocessed one, the policy interpreting means 1 proceeds to step A112. In a case that there is no unprocessed one, that is, when all rules have already been processed by using the action, the policy interpreting means 1 proceeds to step A108. For example, the policy interpreting means 1 processes the first rule of E402 by using "Insert." In a case that there are one or more rules, when the policy interpreting means 1 proceeds from step A110 for the first time, all of the rules are unprocessed.

(12) Step A1112

Next, the policy interpreting means 1 acquires one rule having the highest priority among the rules that have not been processed by using the action concerned, from the list of the rules generated at step A107. For example, the policy interpreting means 1 acquires the first rule of E402 in a case that the first rule of E402 is unprocessed in the list of the rules of E402 and E401 described above. In a case that the first rule of E402 has already been processed and the second rule of E402 has not been processed yet, the policy interpreting means 1 acquires the second rule of E402. In a case that the second rule of E402 has already been processed, the policy interpreting means 1 acquires the rule of E401.

(13) Step A113

Next, the policy interpreting means 1 refers to the rule concerned, acquires an object designated by the rule concerned. For example, in the case of the first rule of E402, the policy interpreting means 1 acquires an object "soumudb."

(14) Step A114

Next, the policy interpreting means 1 refers to the object hierarchy storing means 7, and acquires the granularity of the object concerned. Moreover, the policy interpreting means 1 refers to the action hierarchy and judges whether the granularity of the object concerned is not associated with the action concerned. In a case that the granularity of the object concerned is not associated, the policy interpreting means 1 proceeds to step A115. In a case that the granularity of the object concerned is associated, the policy interpreting means 1 proceeds to step A117. In the object hierarchy storing means 7, for example, information as shown in FIG. 9 is stored as object hierarchies. For example, in a case that the object concerned is "soumudb," the policy interpreting means 1 acquires a granularity "DB" from an object hierarchy E908. Moreover, in a case that the action concerned is "Insert," with reference to the action hierarchy (("DB," "x"), ("Table," "○"), ("Column," "○")) having already been acquired, it is found that the granularity "DB" of the object concerned is not associated with the action concerned.

(15) Step A115

Next, the policy interpreting means 1 refers to the action hierarchy, and judges whether a granularity equal to or lower than that of the object concerned is associated with the action concerned. In a case that the granularity is associated, the policy interpreting means 1 proceeds to step A116. In a case that the granularity is not associated, the policy interpreting means 1 proceeds to step A111. For example, in a case that the object concerned is "soumudb," it is found, with reference to the action hierarchy (("DB," "x"), ("Table," "○"), ("Column," "○")) of the action concerned "Insert," that the action is associated with the granularities "Table" and "Column" that are equal to or lower than that of the object.

(16) Step A116

Next, with reference to the action hierarchy to the policy interpreting means 1 finds granularities associated with the action concerned from among granularities equal to or lower than that of the object concerned, and expands the object concerned to acquire an object with the largest granularity of all the found granularities associated with the action concerned. In the expansion process, the policy interpreting means 1 refers to the object hierarchy storing means 7, and acquires information of an object after expansion based on the object concerned. After this process, the object after expansion is used as the object concerned. For example, in a case that the object concerned is "soumudb," the policy interpreting means 1 refers to the action hierarchy (("DB," "x"), ("Table," "○"), ("Column," "○")) of the action concerned "Insert," and expands the object concerned "soumudb" to acquire an object with the largest granularity "Table" from among granularities "Table" and "Column" equal to or lower than that of the object concerned associated with the action concerned. In this case, the policy interpreting means 1 refers to an object hierarchy E908, and acquires child node objects ("hishotable," "kouhoutable") equivalent to the granularity "Table." If expanding to acquire a smaller granularity, the policy interpreting means 1 refers to an object hierarchy of a child node object, and repeats acquisition of a child node thereof. After that, as the object, the objects after expansion ("hishotable," "kouhoutable") are used.

(17) Step A117

Next, in a case that a rule is processed by using the action concerned and it is found that there are rules added to the target rule of the action concerned, the policy interpreting means 1 judges whether the object concerned is included in objects designated by the target rules. In a case that the object concerned is not included, the policy interpreting means 1 proceeds to step A118. In a case that the object concerned is included, the policy interpreting means 1 proceeds to step A111. In a case that there is a rule to become the target of the action concerned in the steps described above and steps described later, the rule is added and accumulated, namely, temporarily stored into the temporary storing means 8. As the number of the target rules gradually increases in repletion of the abovementioned steps, there is a case that the object of the rule processed and added earlier includes the object of the rule processed later. For example, a case in which a rule of an object ("hishotable") having been processed by the action concerned "Insert" is added and thereafter a rule of an object ("hishocolumn1") having also been processed by the action "Insert" is acquired will be considered. In this case, the former object ("hishotable") includes the latter object ("hishocolumn1"). Because processing of rules for each action is executed in order of priority in a list of rules, the former rule has a higher priority than the latter rule and, based on the aforementioned inclusion relation, existence of the former rule determines the invalidity of the latter rule. Therefore, in a case that an object of the former rule, namely, the existing target rule includes an object of the latter rule, namely, the rule concerned, the policy interpreting means 1 discards the rule concerned because the rule concerned is not necessary anymore and returns to process the next rule. Only when not include, the policy interpreting means 1 proceeds to the following step.

(18) Step A118

Next, the policy interpreting means 1 judges whether the object concerned includes any of the objects designated by the target rule of the action concerned. In a case that the object concerned includes, the policy interpreting means 1 proceeds to step A119. In a case that the object concerned does not include, the policy interpreting means 1 proceeds to step A123. In more detail, the policy interpreting means 1 performs judgment in a contradictory manner to step A117. That is to say, it is a judgment whether the object of the existing target rule is included by the object of the rule concerned. For example, after the rule of the object ("hishocolumn1") having been processed by the action concerned "Insert" is added and thereafter the rule of the object ("hishotable") having also been processed by the action "Insert" is obtained.

(19) Step A119

Next, with regard to a rule in which an object included by the object concerned is designated among the target rules of the action concerned, the policy interpreting means 1 judges whether an action permission/denial of the target rule and an action permission/denial of the rule concerned are different from each other. In a case that they are different, the policy interpreting means 1 proceeds to step A120. In a case that they are the same, the policy interpreting means 1 proceeds to step A122. In a case that there are a plurality of included objects, the policy interpreting means 1 performs the judgment for each of the rules designating the respective objects, and processes them in parallel in accordance with the respective judgment results. For example, in a case that the processing is being performed by the action concerned "Insert," the action permissions/denials are the same when a permission/denial paired with the action "Insert" is "permit" for both the existing target rule and the rule concerned or "deny" for the both.

(20) Step A120

Next, in a case that the granularity of the included object is not the same as that of the object concerned and a range represented by the included object is smaller, the policy interpreting means 1 expands the object concerned to acquire the same granularity as the granularity of the included object. After this process, the object after expansion is used as the object concerned. For example, in a case that an object of the existing target rule is ("hishocolumn1") and an object of the object concerned is ("hishotable"), the policy interpreting means 1 expands the object of the rule concerned with reference to the object hierarchy to acquire objects ("hishocolumn1," "hishocolumn2"). Consequently, for example, assuming a case that the processing is being executed by the action concerned "Insert" and a permission/denial paired with the action "Insert" is "permit" in the existing target rule and "deny" in the rule concerned, a combination including the object ("hishocolumn1"), the action "Insert" and the permission/denial "permit" exists in the existing target rule and a combination including the objects ("hishocolumn1," "hishocolumn2"), the action "Insert" and the permission/denial "deny" exists in the rule concerned.

(21) Step A121

Next, the policy interpreting means 1 eliminates an object in the same range as the included object from the object concerned having been expanded, and generates a rule using only the remaining object concerned. After this process, the rule using the remaining object concerned as the rule concerned. For example, in a case that a combination including the object ("hishocolumn1"), the action "Insert" and the permission/denial "permit" exists in the existing target rule and a combination including the objects ("hishocolumn1," "hishocolumn2"), the action "Insert" and the permission/denial "deny" exists in the rule concerned, as in step A117, the existing target rule has a higher priority than the rule concerned, and therefore, with respect to the rule of the object ("hishocolumn1") designating the same object by the both, the existing target rule is valid and the rule concerned is invalid. Accordingly, only the invalid portion, namely, only a combination including the object ("hishocolumn1"), the action "Insert" and the permission/denial "deny" is eliminated, and only a combination including the object ("hishocolumn2"), the action "Insert" and the permission/denial "deny" is left.

(22) Step A122

Alternatively, the policy interpreting means 1 deletes a rule in which the included object is designated from among the target rules of the action concerned. This is because the rule of the object concerned has the same action permission/denial as the rule of the included object, the rule concerned is enough as a rule showing the same access control content, and the rule designating the included object is not necessary anymore. For example, in a case that with respect to the rule of the object ("hishocolumn1") having been processed by the action concerned "Insert" and the rule concerned of the object ("hishotable") having also been processed by the action "Insert," when a permission/denial paired with the action "Insert" is "permit" in both the existing target rule and the rule concerned or "deny" in both the rules, the existing target rule has a higher priority, but the rule concerned can also express the existing target rule together. Therefore, the policy interpreting means 1 eliminates the existing target rule.

(23) Step A123

Next, the policy interpreting means 1 adds the rule concerned to the target rules of the action concerned. The policy interpreting means 1 proceeds to step A111.

(24) Step A124

Next, when target rule groups for the respective actions acquired by processing on each one of the actions include rules designated for the same object, respectively, the policy interpreting means 1 couples the rules into one rule designating a plurality of action permissions/denials for the same object. That is to say, the policy interpreting means 1 performs object-based aggregation for each of all rule groups. For example, in a case that a combination including the object ("hishotable"), the action "Insert" and the permission/denial "permit" and a combination including the object ("hishotable"), the action "Update" and the permission/denial "permit" exist, the policy interpreting means 1 aggregates them based on the object "hishotable" and couples as a combination of the object ("hishotable") and a set of action permissions/denials (("Insert," "permit"), ("Update," "permit")).

(25) Step A125

Next, the policy interpreting means 1 refers to the subject assignment, and acquires a subject set associated with the role concerned. For example, in a case that the role concerned is "general affairs department," the policy interpreting means 1 acquires a subject set ("k-satou," "m-suzuki") based on the subject assignment E601.

(26) Step A126

Next, the policy interpreting means 1 combines sets of authorities defined by the rule groups with the subject set concerned, and consequently, generates sets of access authorities. The policy interpreting means 1 proceeds to step A101. For example, by combining authority sets (("kaikeitable," (("Insert," "deny"), ("Update," "deny"), ("Delete," "deny"), ("Select," "permit"), ("References," "permit"), ("Index," "deny"))), (("shaintable," (("Insert," "permit"), ("Update," "permit"), ("Delete," "permit"), ("Select," "permit"), ("References," "permit"), ("Index," "deny"))), (("kaishadb," (("Create," "deny"), ("Drop," "deny"), ("Alter," "deny"), ("Grant," "permit"), ("Lock," "permit")))) with the subject set ("k-satou," "m-suzuki"), the policy interpreting means 1 generates combinations of access authorities, and generates sets of access authorities (("k-satou," ("kaikeitable," (("Insert," "deny"), ("Update," "deny"), ("Delete," "deny"), ("Select," "permit"), ("References," "permit"), ("Index," "deny")))), (("k-satou," ("shaintable," (("Insert," "permit"), ("Update," "permit"), ("Delete," "permit", ("Select," "permit"), ("References," "permit"), ("Index," "deny")))), ("k-satou," ("kaishadb," (("Create," "deny"), ("Drop," "deny"), ("Alter," "deny"), ("Grant," "permit"), ("Lock," "permit")))), (("m-suzuki," ("kaikeitable," (("Insert," "deny"), ("Update," "deny"), ("Delete," "deny"), ("Select," "permit"), ("References," "permit"), ("Index," "deny")))), ("m-suzuki," ("shaintable," (("Insert," "permit"), ("Update," "permit"), ("Delete," "permit", ("Select," "permit"), ("References," "permit"), ("Index," "deny")))), ("m-suzuki" "kaishadb," (("Create," "deny"), (Drop," "deny"), ("Alter," "deny"), ("Grant," "permit"), ("Lock," "permit"))))),

(27) Step A127

Next, the policy interpreting means 1 outputs the sets of access authorities acquired and coupled for each one of the subject assignments, to the access control executing means 2 as an access authority obtained by the policy interpretation process. Into the access control executing means 2, for example, information as shown in FIG. 5 is inputted as the access authority. In the example shown in FIG. 5, based on the concept of Default Deny that is general control of RBAC, all actions are denied with respect to an object which does not appear in access authorities in combination with a certain subject Thus, the policy interpreting means 1 derives, from an access control policy having a precedence constraint described for each role, a set of authorities in access authorities without precedence constraint set in the access control execution function.

Thus, according to the present invention, in the policy interpretation function for deriving a set of authorities in access authorities without precedence constraint set in the access control execution function, from access control policies having precedence constraint described for each role, even when a competition spanning object hierarchies formed by different kinds of objects exists between sets of authorities shown by the access control policies in the inheritance relation based on the role hierarchy, it is possible to derive a set of permissions/denials without competition by using role hierarchy information, object hierarch information, and action hierarchy information for each kind of object.

The present invention is based upon and claims the benefit of priority from Japanese patent application No. 2010-211515, filed on Sep. 22, 2010, the disclosure of which is incorporated herein in its entirety by reference.

INDUSTRIAL APPLICABILITY

The present invention can be applied to a device which automatically generates a set of access authorities without a precedence constraint used for access control of one or more computers, from a set of authorities for each role having a precedence constraint generated by the user.

The whole or part of the exemplary embodiments disclosed above can be described as, but not limited to, the following supplementary notes.

(Supplementary Note 1)

An access authority generation device, comprising:

a policy storing means for storing a set of authorities having a precedence constraint, in association with a role, wherein a combination of an object, an action and a permission/denial identifier representing whether to permit or deny the action on the object is defined as an authority;

a subject assignment storing means for storing information about a relation between a role and a subject belonging to the role;

an object hierarchy storing means for storing information about an inclusion relation between objects;

a temporary storing means;

a process target set extracting means for extracting a set of authorities having a precedence constraint from the policy storing means, as a process target set, in association with a role;

a precedence constraint solving means for generating a set of authorities without a precedence constraint into the temporary storing means from the process target set extracted for a role, in association with the role, the precedence constraint solving means being configured to:

derive an authority in accordance with an order satisfying the precedence constraint from the process target set associated with the role, and determine the derived authority, as a process target authority;

in a case that an object of the process target authority includes an object of an authority having a same action that has already been generated in the temporary storing means and permission/denial identifiers of both the authorities are different from each other, divide the process target authority into a plurality of authorities having objects of same granularity as that of the included object; and store an authority having a different object from the included object among the plurality of authorities obtained by the division, into the temporary storing means; and an access authority generating means for generating a set of access authorities associated with the subject from the set of authorities without the precedence constraint generated for the role and the information about the relation between the role and the subject, wherein a combination of a subject, an object, an action and a permission/denial identifier representing whether to permit or deny the subject the action on the object is defined as an access authority.

(Supplementary Note 2)

The access authority generation device according to Supplementary Note 1, comprising a role hierarchy storing means for storing information about an inheritance relation between roles, wherein the process target set extracting means is configured to extract and couple the set of authorities having the precedence constraint stored in the policy storing means in association with the role and a set of authorities having a precedence constraint stored in the policy storing means in association with an inheritance source role of the role represented by the inheritance relation between the roles, thereby generating a process target set that is a set of authorities having a precedence constraint.

(Supplementary Note 3)

The access authority generation device according to Supplementary Note 1 or 2, wherein the precedence constraint solving means is configured to discard the process target authority having an object included in an object of an authority having a same action stored in the temporary storing means.

(Supplementary Note 4)

The access authority generation device according to any of Supplementary Notes 1 to 3, comprising an action hierarchy storing means for storing information about a relation between the object and an action, wherein the precedence constraint solving means is configured to, in a case that an action of the process target authority is not associated with granularity of the object of the process target authority, divide the process target authority into a plurality of process target authorities having objects of smaller granularity associated with the action and then process.

(Supplementary Note 5)

The access authority generation device according to any of claims 1 to 4, wherein the precedence constraint solving means is configured to, in a case that the object of the process target authority includes the object of the authority having the same action stored in the temporary storing means and the permission/denial identifiers of both the authorities are identical to each other, store the process target authority into the temporary storing means and delete the authority having the same action and the same permission/denial identifier stored in the temporary storing means.

(Supplementary Note 6)

The access authority generation device according to any of Supplementary Note 1 to 5, wherein the access authority generating means is configured to integrate a plurality of access authorities having same subjects, objects and permission/denial identifiers and having different actions, into one access authority.

(Supplementary Note 7)

An access control system, comprising:

the access authority generation device according to any of claims 1 to 6; and an access control executing means for storing an access authority generated by the access authority generation device and executing access control based on the stored access authority.

(Supplementary Note 8)

An access authority generation device, comprising:

a memory having: a policy storing region for storing a set of authorities having a precedence constraint, in association with a role, wherein a combination of an object, an action and a permission/denial identifier representing whether to permit or deny the action on the object is defined as an authority; a subject assignment storing region for storing information about a relation between a role and a subject belonging to the role; an object hierarchy storing region for storing information about an inclusion relation between objects; and a temporary storing region; and a processor connected to the memory, wherein the processor is programmed to:

extract a set of authorities having a precedence constraint from the policy storing region, as a process target set, in association with a role;

when generating a set of authorities without a precedence constraint into the temporary storing region from the process target set extracted for a role, in association with the role: firstly derive an authority in accordance with an order satisfying the precedence constraint from the process target set associated with the role, and determine the derived authority, as a process target authority; next, in a case that an object of the process target authority includes an object of an authority having a same action that has already been generated in the temporary storing region and permission/denial identifiers of both the authorities are different from each other, divide the process target authority into a plurality of authorities having objects of same granularity as that of the included object; and next store an authority having a different object from the included object among the plurality of authorities obtained by the division, into the temporary storing region; and generate a set of access authorities associated with the subject from the set of authorities without the precedence constraint generated for the role and the information about the relation between the role and the subject, wherein a combination of a subject, an object, an action and a permission/denial identifier representing whether to permit or deny the subject the action on the object is defined as an access authority.

(Supplementary Note 9)

The access authority generation device according to Supplementary Note 8, wherein:

the memory further has a role hierarchy storing region for storing information about an inheritance relation between roles; and the processor is programmed to, in the extraction of the process target set, extract and couple the set of authorities having the precedence constraint stored in the policy storing region in association with the role and a set of authorities having a precedence constraint stored in the policy storing region in association with an inheritance source role of the role represented by the inheritance relation between the roles, thereby generating a process target set that is a set of authorities having a precedence constraint.

(Supplementary Note 10)

The access authority generation device according to Supplementary Note 8 or 9, wherein the processor is programmed to, in the generation of the set of authorities without the precedence constraint into the temporary storing region, discard the process target authority having an object included in an object of an authority having a same action stored in the temporary storing region.

(Supplementary Note 11)

The access authority generation device according to any of Supplementary Notes 8 to 10, wherein:

the memory further has an action hierarchy storing region for storing information about a relation between the object and an action; and the processor is programmed to, in the generation of the set of authorities without the precedence constraint into the temporary storing region, in a case that an action of the process target authority is not associated with granularity of the object of the process target authority, divide the process target authority into a plurality of process target authorities having objects of smaller granularity associated with the action and then process.

(Supplementary Note 12)

The access authority generation device according to any of Supplementary Notes 8 to 11, wherein the processor is programmed to, in the generation of the set of authorities without the precedence constraint into the temporary storing region, in a case that the object of the process target authority includes the object of the authority having the same action stored in the temporary storing region and the permission/denial identifiers of both the authorities are identical to each other, store the process target authority into the temporary storing region and delete the authority having the same action and the same permission/denial identifier stored in the temporary storing region.

(Supplementary Note 13)

The access authority generation device according to any of Supplementary Notes 8 to 12, wherein the processor is programmed to, in the generation of the set of authorities without the precedence constraint into the temporary storing region, integrate a plurality of access authorities having same subjects, objects and permission/denial identifiers and having different actions, into one access authority.

(Supplementary Note 14)

The access authority generation device according to any of Supplementary Notes 8 to 13, wherein the processor is programmed to further execute access control based on the generated access authority.

(Supplementary Note 15)

An access authority generation method executed by an access authority generation device having: a policy storing means for storing a set of authorities having a precedence constraint, in association with a role, wherein a combination of an object, an action and a permission/denial identifier representing whether to permit or deny the action on the object is defined as an authority; a subject assignment storing means for storing information about a relation between a role and a subject belonging to the role; an object hierarchy storing means for storing information about an inclusion relation between objects; a temporary storing means; a process target set extracting means; a precedence constraint solving means; and an access authority generating means, the access authority generation method comprising:

extracting a set of authorities having a precedence constraint from the policy storing means, as a process target set, in association with a role, by the process target set extracting means;

generating a set of authorities without a precedence constraint into the temporary storing means from the process target set extracted for a role, in association with the role, by the precedence constraint solving means; and generating a set of access authorities associated with the subject from the set of authorities without the precedence constraint generated for the role and the information about the relation between the role and the subject, by the access authority generating means, wherein a combination of a subject, an object, an action and a permission/denial identifier representing whether to permit or deny the subject the action on the object is defined as an access authority, and the access authority generation method comprising, in the generation of the set of authorities without the precedence constraint:

deriving an authority in accordance with an order satisfying the precedence constraint from the process target set associated with the role, and determining the derived authority as a process target authority;

in a case that an object of the process target authority includes an object of an authority having a same action that has already been generated in the temporary storing means and permission/denial identifiers of both the authorities are different from each other, dividing the process target authority into a plurality of authorities having objects of same granularity as that of the included object; and storing an authority having a different object from the included object among the plurality of authorities obtained by the division, into the temporary storing means.

(Supplementary Note 16)

An access authority generation method executed by an access authority generation device having:

a memory having: a policy storing region for storing a set of authorities having a precedence constraint, in association with a role, wherein a combination of an object, an action and a permission/denial identifier representing whether to permit or deny the action on the object is defined as an authority; a subject assignment storing region for storing information about a relation between a role and a subject belonging to the role; an object hierarchy storing region for storing information about an inclusion relation between objects; and a temporary storing region; and a processor connected to the memory, the access authority generation method, comprising:

extracting a set of authorities having a precedence constraint from the policy storing region, as a process target set, in association with a role, by the processor;

when generating a set of authorities without a precedence constraint into the temporary storing region from the process target set extracted for a role, in association with the role: firstly deriving an authority in accordance with an order satisfying the precedence constraint from the process target set associated with the role, and determining the derived authority, as a process target authority; next, in a case that an object of the process target authority includes an object of an authority having a same action that has already been generated in the temporary storing region and permission/denial identifiers of both the authorities are different from each other, dividing the process target authority into a plurality of authorities having objects of same granularity as that of the included object; and next storing an authority having a different object from the included object among the plurality of authorities obtained by the division, into the temporary storing region, by the processor; and generating a set of access authorities associated with the subject from the set of authorities without the precedence constraint generated for the role and the information about the relation between the role and the subject, wherein a combination of a subject, an object, an action and a permission/denial identifier representing whether to permit or deny the subject the action on the object is defined as an access authority, by the processor.

(Supplementary Note 17)

A program for causing a computer having: a policy storing means for storing a set of authorities having a precedence constraint, in association with a role, wherein a combination of an object, an action and a permission/denial identifier representing whether to permit or deny the action on the object is defined as an authority; a subject assignment storing means for storing information about a relation between a role and a subject belonging to the role; an object hierarchy storing means for storing information about an inclusion relation between objects; and a temporary storing means to function as:

a process target set extracting means for extracting a set of authorities having a precedence constraint from the policy storing means, as a process target set, in association with a role;

a precedence constraint solving means for generating a set of authorities without a precedence constraint into the temporary storing means from the process target set extracted for a role, in association with the role, the precedence constraint solving means being configured to:

derive an authority in accordance with an order satisfying the precedence constraint from the process target set associated with the role, and determine the derived authority as a process target authority;

in a case that an object of the process target authority includes an object of an authority having a same action that has already been generated in the temporary storing means and permission/denial identifiers of both the authorities are different from each other, divide the process target authority into a plurality of authorities having objects of same granularity as that of the included object; and store an authority having a different object from the included object among the plurality of authorities obtained by the division, into the temporary storing means; and an access authority generating means for generating a set of access authorities associated with the subject from the set of authorities without the precedence constraint generated for the role and the information about the relation between the role and the subject, wherein a combination of a subject, an object, an action and a permission/denial identifier representing whether to permit or deny the subject the action on the object is defined as an access authority.

(Supplementary Note 18)

A computer-readable recording medium storing a program for causing a computer having: a policy storing means for storing a set of authorities having a precedence constraint, in association with a role, wherein a combination of an object, an action and a permission/denial identifier representing whether to permit or deny the action on the object is defined as an authority; a subject assignment storing means for storing information about a relation between a role and a subject belonging to the role; an object hierarchy storing means for storing information about an inclusion relation between objects; and a temporary storing means, to function as:

a process target set extracting means for extracting a set of authorities having a precedence constraint from the policy storing means, as a process target set, in association with a role;

a precedence constraint solving means for generating a set of authorities without a precedence constraint into the temporary storing means from the process target set extracted for a role, in association with the role, the precedence constraint solving means being configured to:

derive an authority in accordance with an order satisfying the precedence constraint from the process target set associated with the role, and determine the derived authority, as a process target authority;

in a case that an object of the process target authority includes an object of an authority having a same action that has already been generated in the temporary storing means and permission/denial identifiers of both the authorities are different from each other, divide the process target authority into a plurality of authorities having objects of same granularity as that of the included object; and store an authority having a different object from the included object among the plurality of authorities obtained by the division, into the temporary storing means; and an access authority generating means for generating a set of access authorities associated with the subject from the set of authorities without the precedence constraint generated for the role and the information about the relation between the role and the subject, wherein a combination of a subject, an object, an action and a permission/denial identifier representing whether to permit or deny the subject the action on the object is defined as an access authority.

DESCRIPTION OF REFERENCE NUMERALS 1 policy interpreting means
2 access control executing means
3 subject assignment storing means
4 role hierarchy storing means
5 policy storing means
6 action hierarchy storing means
7 object hierarchy storing means
8 temporary storing means

The invention claimed is:

1. An access authority generation device, comprising:

a memory comprising: a policy storing region for storing a first set of authorities having a precedence constraint associated with a role, wherein a combination of an object, an action and a permission/denial identifier representing whether to permit or deny the action on the object is defined as an authority, wherein the object is one of a database and a table of a plurality of tables of the database, and wherein the first set of authorities includes a first authority and a second authority, the first authority being associated with a first role that permits or denies a specific action on a specific table among the plurality of tables of the database, the second authority being associated with the first role and that permits or denies the specific action on the database, and the first authority having a higher priority than the second authority; a subject assignment storing region for storing information about a relation between the first role and a subject belonging to the first role; an object hierarchy storing region for storing information about an inclusion relation between the database and the plurality of tables; and a non-permanent storage region; and a processor connected to the memory, wherein the processor is programmed to:

extract the first set of authorities having the precedence constraint from the policy storing region, as a process target set, in association with the first role;

when generating and storing a second set of authorities which do not have the precedence constraint into the non-permanent storage region from the process target set extracted for the first role, in association with the first role: first, deriving an authority in accordance with an order satisfying the precedence constraint from the process target set associated with the first role, and determining the derived authority, as a process target authority; next, when a first object of the process target authority includes a second object of an authority having a same action that has already been generated in the non-permanent storage region and permission/denial identifiers of both the authorities are different from each other, expanding the first object of the process target authority to a granularity of the included second object, set an authority in which the included second object is eliminated from the first object of the process target authority after expansion, and store the authority in which the second included object is eliminated from the first object of the process target authority after expansion, wherein the first object is the database and the second object is one of the plurality of tables, and wherein the generated and stored second set of authorities includes a third authority and a forth authority, the third authority permitting or denying the specific action on the specific table of the plurality of tables of the database, and the forth authority permitting or denying the specific action on each of the tables, other than the specific table, of the database; and generate a set of access authorities associated with the subject from the second set of authorities without the precedence constraint generated for the first role and the information about the relation between the first role and the subject, wherein a combination of a subject, an object, an action and a permission/denial identifier representing whether to permit or deny the subject the action on the object is defined as an access authority, and wherein the generated set of access authorities includes a fifth authority and a sixth authority, the fifth authority permitting or denying, for the subject, the specific action on the specific table of the plurality of tables of the database, and the sixth authority permitting or denying, for the subject, the specific action on each of the tables, other than the specific table, of the database, wherein when the granularity of the included second object is not the same as the granularity of the first object of the process target authority and a range represented by the included second object is smaller than a range of the first object of the process target authority, the expanding the first object includes expanding the first object of the process target authority to the same granularity of the included second object.

2. The access authority generation device according to claim 1, wherein:
the memory further has a role hierarchy storing region for storing information about an inheritance relation between roles; and
the processor is programmed to, in the extraction of the process target set, extract and couple the first set of authorities having the precedence constraint stored in the policy storing region in association with the first role and a third set of authorities which have the precedence constraint stored in the policy storing region in association with an inheritance source role of the first role represented by the inheritance relation between the roles, thereby generating the process target set that is configured to be a coupled set of authorities having the precedence constraint.

3. The access authority generation device according to claim 1, wherein the processor is programmed to, in the generation of the second set of authorities without the precedence constraint into the non-permanent storage region, discard the process target authority having an object included in an object of an authority having an action previously stored in the non-permanent storage region.

4. The access authority generation device according to claim 1, wherein:
the memory further has an action hierarchy storing region for storing information about a relation between the object and an action; and
the processor is programmed to, in the generation of the second set of authorities without the precedence constraint into the non-permanent storage region, when an action of the process target authority is not associated with granularity of the first object of the process target authority, expand the first object of the process target authority to a granularity of the included second object and then process.

5. The access authority generation device according to claim 1, wherein the processor is programmed to, in the generation of the second set of authorities without the precedence constraint into the non-permanent storage region, when the first object of the process target authority includes an object of the authority having the same action stored in the non-permanent storage region and the permission/denial identifiers of both the authorities are identical to each other, store the process target authority into the non-permanent storage region and delete the authority having the same action and the same permission/denial identifier stored in the non-permanent storage region.

6. The access authority generation device according to claim 1, wherein the processor is programmed to, in the generation of the set of access authorities associated with the subject, integrate a plurality of access authorities having same subjects, objects and permission/denial identifiers and having different actions, into one access authority.

7. The access authority generation device according to claim 1, wherein the processor is programmed to further execute access control based on the generated access authority.

8. An access authority generation method executed by an access authority generation device having:
a memory having: a policy storing region for storing a first set of authorities having a precedence constraint, in association with a role, wherein a combination of an object, an action and a permission/denial identifier representing whether to permit or deny the action on the object is defined as an authority, wherein the object is one of a database and a table of a plurality of tables of the database, and wherein the first set of authorities includes a first authority and a second authority, the first authority being associated with a first role that permits or denies a specific action on a specific table among the plurality of tables of the database, the second authority being associated with the first role and that permits or denies the specific action on the database, and the first authority having a higher priority than the second authority; a subject assignment storing region for storing information about a relation between the first role and a subject belonging to the first role; an object hierarchy storing region for storing information about an inclusion relation between the database and the plurality of tables; and a non-permanent storage region; and
a processor connected to the memory,
the access authority generation method, comprising:
extracting the first set of authorities having the precedence constraint from the policy storing region, as a process target set, in association with the first role, by the processor;
when generating and storing a second set of authorities without the precedence constraint into the non-permanent storage region from the process target set extracted for the first role, in association with the first role: first, deriving an authority in accordance with an order satisfying the precedence constraint from the process target set associated with the first role, and determining the derived authority, as a process target authority; next, when a first object of the process target authority includes a second object of an authority having a same action that has already been generated in the non-permanent storage region and permission/denial identifiers of both the authorities are different from each other, expanding the first object of the process target authority to a granularity of the included second object, set an authority in which the included second object is eliminated from the first object of the process target authority after expansion, and store the authority in which the included second object is eliminated from the first object of the process target authority after expansion, by the processor, wherein the first object is the database and the second object is one of the plurality of tables, and wherein the generated and stored second set of authorities includes a third authority and a forth authority, the third authority permitting or denying the specific action on the specific table of the plurality of tables of the database, and the forth authority permitting or denying the specific action on each of the tables, other than the specific table, of the database; and generating a set of access authorities associated with the subject from the second set of authorities without the precedence constraint generated for the first role and the information about the relation between the first role and the subject, wherein a combination of a subject, an object, an action and a permission/denial identifier representing whether to permit or deny the subject the action on the object is defined as an access authority, by the processor, and wherein the generated set of access authorities includes a fifth authority and a sixth authority, the fifth authority permitting or denying, for the subject, the specific action on the specific table of the plurality of tables of the database, and the sixth authority permitting or denying, for the subject, the specific action on each of the tables, other than the specific table, of the database, wherein when the granularity of the included second object is not the same as the granularity of the first object of the process target authority and a range represented by the included second object is smaller than a range of the first object of the process target authority, the expanding the first object includes expanding the first object of the process target authority to the same granularity of the included second object.

9. The access authority generation method according to claim 8, wherein the memory further has a role hierarchy storing region for storing information about an inheritance relation between roles, the access authority generation method comprising: in the extraction of the process target set, extracting and coupling the first set of authorities having the precedence constraint stored in the policy storing region in association with the first role and the first set of authorities having the precedence constraint stored in the policy storing region in association with an inheritance source role of the first role represented by the inheritance relation between the roles, thereby generating the process target set that is configured to be a coupled set of authorities having the precedence constraint, by the processor, wherein the coupled set of authorities corresponds to the first set of authorities.

10. The access authority generation method according to claim 8, comprising: in the generation of the second set of authorities without the precedence constraint into the non-permanent storage region, discarding the process target authority having an object included in an object of an authority having an action previously stored in the non-permanent storage region, by the processor.

11. The access authority generation method according to claim 8, wherein the memory further has an action hierarchy storing region for storing information about a relation between the object and an action, the access authority generation method comprising: in the generation of the second set of authorities without the precedence constraint into the non-permanent storage region, when an action of the process target authority is not associated with granularity of the first object of the process target authority, expand the first object of the process target authority to a granularity of the included second object then processing, by the processor.

12. The access authority generation method according to claim 8, comprising: in the generation of the second set of authorities without the precedence constraint into the non-permanent storage region, when the first object of the process target authority includes the second object of the authority having the same action stored in the non-permanent storage region and the permission/denial identifiers of both the authorities are identical to each other, storing the process target authority into the non-permanent storage region and deleting the authority having the same action and the same permission/denial identifier stored in the non-permanent storage region, by the processor.

13. The access authority generation method according to claim 8, comprising: in the generation of the set of access authorities associated with the subject, integrating a plurality of access authorities having same subjects, objects and permission/denial identifiers and having different actions, into one access authority, by the processor.

14. The access authority generation method according to claim 8, further comprising executing access control based on the generated access authority by the processor.

15. A non-transitory computer readable medium storing a program for causing a computer having: a policy storing unit for storing a first set of authorities having a precedence constraint, in association with a role, wherein a combination of an object, an action and a permission/denial identifier representing whether to permit or deny the action on the object is defined as an authority, wherein the object is one of a database and a table of a plurality of tables of the database, and wherein the first set of authorities includes a first authority and a second authority, the first authority being associated with a first role that permits or denies a specific action on a specific table among the plurality of tables of the database, the second authority being associated with the first role and that permits or denies the specific action on the database, and the first authority having a higher priority than the second authority; a subject assignment storing unit for storing information about a relation between the first role and a subject belonging to the first role; an object hierarchy storing unit for storing information about an inclusion relation between the database and the plurality of tables; and a storage unit, to function as:

a process target set extracting unit for extracting the first set of authorities having the precedence constraint from the policy storing unit, as the process target set, in association with the first role;

a precedence constraint solving unit for generating and storing a second set of authorities without the precedence constraint into the non-permanent storage unit from the process target set extracted for the first role, in association with the first role, the precedence constraint solving unit being configured to:

derive an authority in accordance with an order satisfying the precedence constraint from the process target set associated with the first role, and determine the derived authority, as a process target authority;

when a first object of the process target authority includes a second object of an authority having a same action that has already been generated in the non-permanent storage unit and permission/denial identifiers of both the authorities are different from each other, expanding the first object of the process target authority to a granularity of the included second object, and setting an authority in which the included second object is eliminated from the object of the process target authority after expansion; and store the authority in which the included second object is eliminated from the first object of the process target authority after expansion, into the non-permanent storage unit, wherein the first object is the database and the second object is one of the plurality of tables, and wherein the generated and stored second set of authorities includes a third authority and a forth authority, the third authority permitting or denying the specific action on the specific table of the plurality of tables of the database, and the forth authority permitting or denying the specific action on each of the tables, other than the specific table, of the database; and an access authority generating unit for generating a set of access authorities associated with the subject from the second set of authorities without the precedence constraint generated for the first role and the information about the relation between the first role and the subject, wherein a combination of a subject, an object, an action and a permission/denial identifier representing whether to permit or deny the subject the action on the object is defined as an access authority, and wherein the generated set of access authorities includes a fifth authority and a sixth authority, the fifth authority permitting or denying, for the subject, the specific action on the specific table of the plurality of tables of the database, and the sixth authority permitting or denying, for the subject, the specific action on each of the tables, other than the specific table, of the database, wherein when the granularity of the included second object is not the same as the granularity of the first object of the process target authority and a range represented by the included second object is smaller than a range of the first object of the process target authority, the expanding the first object includes expanding the first object of the process target authority to the same granularity of the included second object.

16. An access authority generation device, comprising:

a memory comprising:

a policy storing region which is configured to store at least one role authority comprising a precedence constraint, each role authority comprising an association between an object, an action, and a permission/denial identifier, wherein the object is one of a database and a table of a plurality of tables of the database, and wherein the at least one role authority comprises a first role authority and a second role authority, the first role authority being associated with a first role that permits or denies a specific action on a specific table among the plurality of tables of the database, the second role authority being associated with the first role and that permits or denies the specific action on the database, and the first role authority having a higher priority than the second role authority;

a role association region which is configured to store information associated with the first role and at least one subject;

an object hierarchy region which is configured to store information regarding relationships between the database and the plurality of tables; and a non-permanent storage region; and a processor connected to the memory, wherein the processor is programmed to:

extract the at least one role authority from the policy storing region to form a process target set, generate at least one non-precedence role authority, which does not include the precedence constraint;

store the at least one non-precedence role into the non-permanent storage region;

derive an authority according to the precedence constraint from the process target set and determining a process target authority according to the derived authority;

when a first object of the process target authority includes a second object of an authority having a same action but a different permission/denial identifier than the object already as stored in the non-permanent storage region, expanding the first object of the process target authority to a granularity of the included second object, setting an authority in which the included second object is eliminated from the first object of the process target authority after expansion, and storing the authority in which the included second object is eliminated after expansion, wherein the first object is the database and the second object one of the plurality of tables, and wherein the generated and stored at least one non-precedence role comprises a third role authority and a forth role authority, the third role authority permitting or denying the specific action on the specific table of the plurality of tables of the database, and the forth role authority permitting or denying the specific action on each of the tables, other than the specific table, of the database; and generate at least one subject authority associated with the at least one subject from the at least one non-precedence role authority and the information associated with the first role and at least one subject, wherein each of the at least one subject authority comprises a subject, an object, and action, and a permission/denial identifier, and wherein the generated at least one subject authority comprises a fifth role authority and a sixth role authority, the fifth role authority permitting or denying, for the subject, the specific action on the specific table of the plurality of tables of the database, and the sixth role authority permitting or denying, for the subject, the specific action on each of the tables, other than the specific table, of the database wherein when the granularity of the included second object is not the same as the granularity of the first object of the process target authority and a range represented by the included second object is smaller than a range of the first object of the process target authority, the expanding the first object includes expanding the first object of the process target authority to the same granularity of the included second object.

* * * * *